United States Patent
Zhang et al.

(10) Patent No.: US 10,024,673 B1
(45) Date of Patent: Jul. 17, 2018

(54) IDENTIFYING A MAP MATCHED TRIP FROM RECEIVED GEOGRAPHIC POSITION INFORMATION

(71) Applicant: Uber Technologies, Inc., San Francisco, CA (US)

(72) Inventors: Xingwen Zhang, Millbrae, CA (US); Thi Duong Nguyen, San Francisco, CA (US); Miao Yu, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 57 days.

(21) Appl. No.: 15/164,390

(22) Filed: May 25, 2016

(51) Int. Cl.
*G01C 21/34* (2006.01)
*G01S 19/42* (2010.01)
*G06Q 50/30* (2012.01)

(52) U.S. Cl.
CPC .......... *G01C 21/3446* (2013.01); *G01S 19/42* (2013.01); *G06Q 50/30* (2013.01); *G06Q 2240/00* (2013.01)

(58) Field of Classification Search
None
See application file for complete search history.

(56) References Cited

U.S. PATENT DOCUMENTS

| | | | | |
|---|---|---|---|---|
| 8,660,789 B2* | 2/2014 | Demiryurek | ....... | G01C 21/3492 701/414 |
| 2012/0283948 A1* | 11/2012 | Demiryurek | ....... | G01C 21/3446 701/533 |
| 2015/0354973 A1* | 12/2015 | Wang | ..................... | G01C 21/30 701/410 |
| 2016/0178386 A1* | 6/2016 | Schilling | ................. | H03M 7/40 701/533 |

* cited by examiner

*Primary Examiner* — Kimberly S Berona
*Assistant Examiner* — Edward Torchinsky
(74) *Attorney, Agent, or Firm* — Fenwick & West LLP

(57) ABSTRACT

A map server receives geographic points from a location tracking device located in a vehicle. The received geographic points describe a path that is representative of a pathway of the vehicle used to complete a trip from a starting location to a destination location. The map server identifies candidate geographic points for each received geographic point where each candidate geographic point is associated with a location on a known roadway. The map server determines a graph of the candidate geographic points and identifies different sub-graphs from the graph. The map server iteratively evaluates the sub-graphs to determine a shortest path from the starting location to the destination location without evaluating all the edges in the sub-graphs.

18 Claims, 20 Drawing Sheets

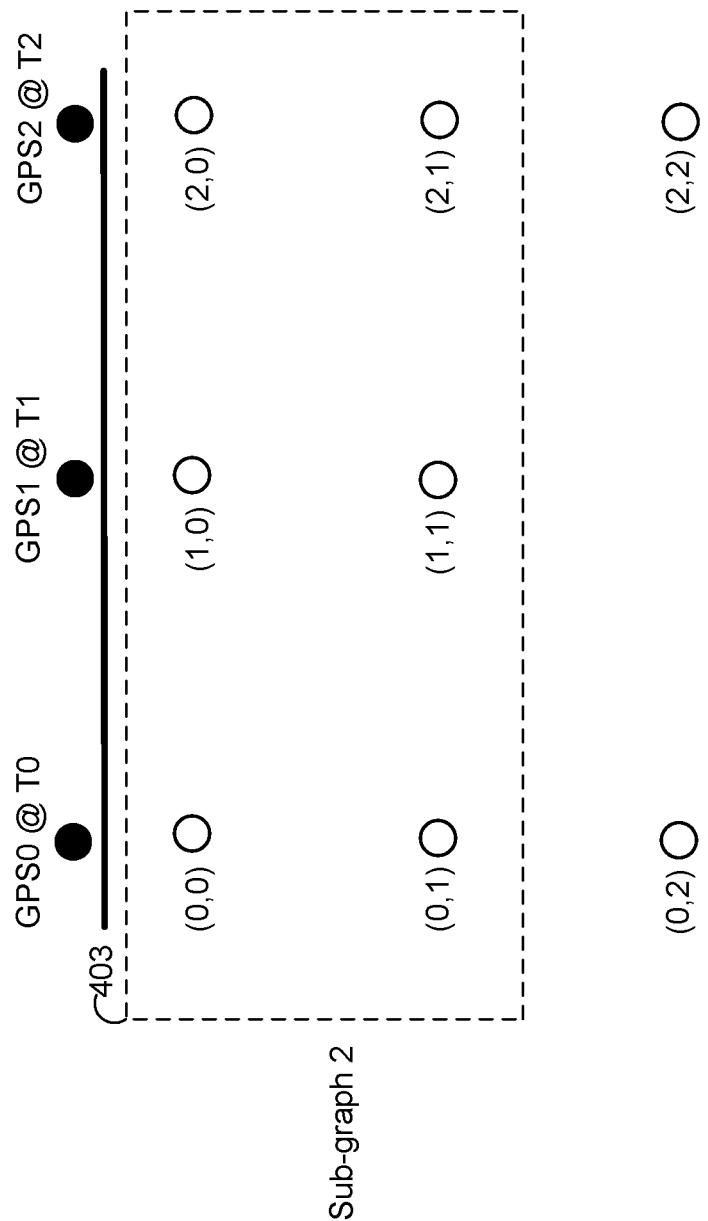

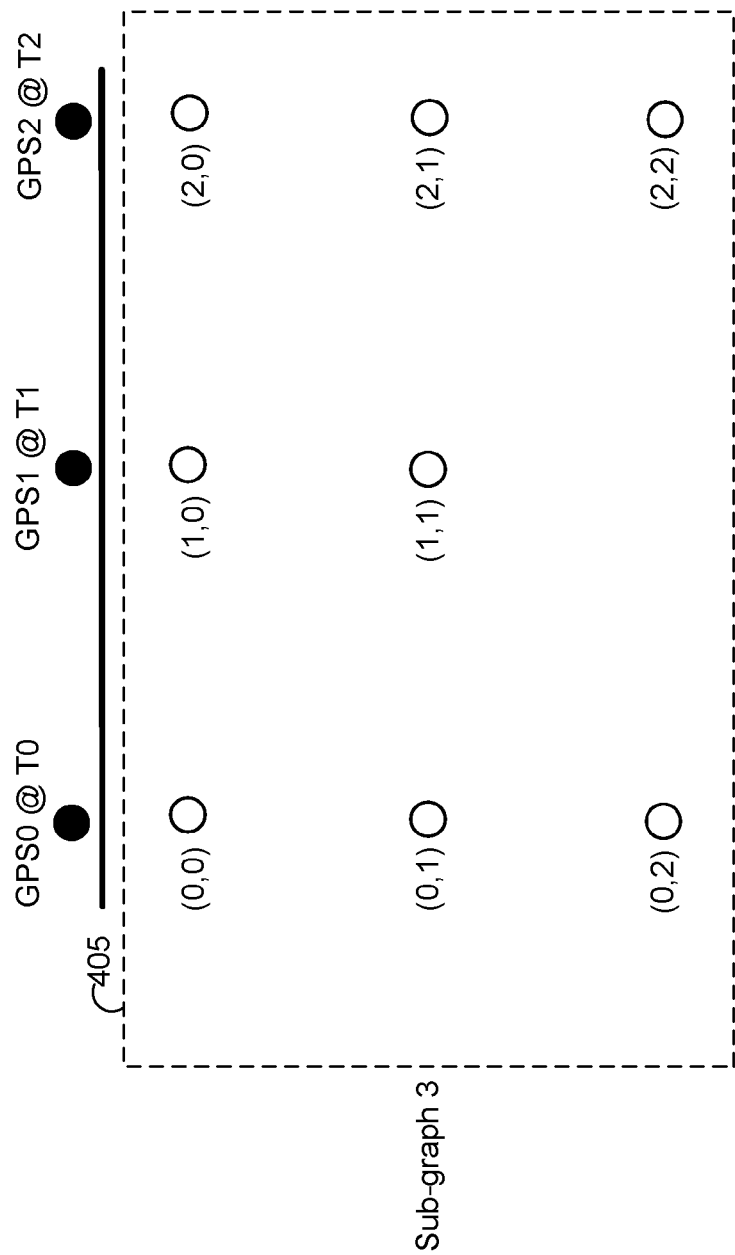

IDENTIFYING A MAP MATCHED TRIP FROM RECEIVED GEOGRAPHIC POSITION INFORMATION

TECHNICAL FIELD

The embodiments disclosed herein generally relate to determining a map matched trip using geographic positioning information.

BACKGROUND

Current systems use geographic positioning information from a location tracking device located in a vehicle to perform various functions such as determining shortest path trips. Conventional systems use algorithms such as the A* algorithm on geographic positioning information to identify the shortest paths of trips based on the geographic positioning information. However, using the conventional A* algorithm to determine the shortest path of a trip requires the calculation of edge costs of all edges in the trip. The application of conventional A* algorithm consumes much of the computing resources of the system, such as CPU usage and memory usage, since edge evaluation is computationally expensive and current systems calculate the edge costs of all edges in a trip.

SUMMARY

An operator of a vehicle provides services such as transporting a person or goods to a requested destination. A map server (e.g., a computing system) is in communication with a location tracking device that is located within the vehicle and receives geographic information from the location tracking device as the vehicle moves its position (e.g., travels) to complete a transport service (e.g., also referred to herein as a trip) from a starting location to the requested destination. The geographic information includes geographic points that are each associated with a timestamp that describes when the location tracking device measured the geographic point.

According to some examples, the map server identifies a set of candidate geographic points for each of the received geographic points. The set of candidate geographic points are associated with positions along a known road network. The map server determines a graph that includes at least some of the sets of candidate geographic points, where each candidate geographic point is arranged in the graph according to the timestamp of the received geographic point that is associated with the candidate geographic point.

In one example, the map server determines multiple sub-graphs from the determined graph. The map server iteratively applies a path searching algorithm to the sub-graphs to identify a shortest path from the starting location to the destination location from the sub-graphs. When applying the path searching algorithm to the sub-graphs, the map server evaluates a portion of all possible edges that connect together the candidate geographic points in the graph (e.g., as opposed to evaluating all possible edges). Since the map server only evaluates a portion of all possible edges in the sub-graphs, the map server reduces the usage of computing resources of the map server.

The features and advantages described in this summary and the following detailed description are not all inclusive. Many additional features and advantages will be apparent to one of ordinary skill in the art in view of the drawings, specification and claims.

BRIEF DESCRIPTION OF THE DRAWINGS

FIGS. 4A, 4B, and 4C illustrate sub-graphs of the trellis graph shown in FIG. 3 according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
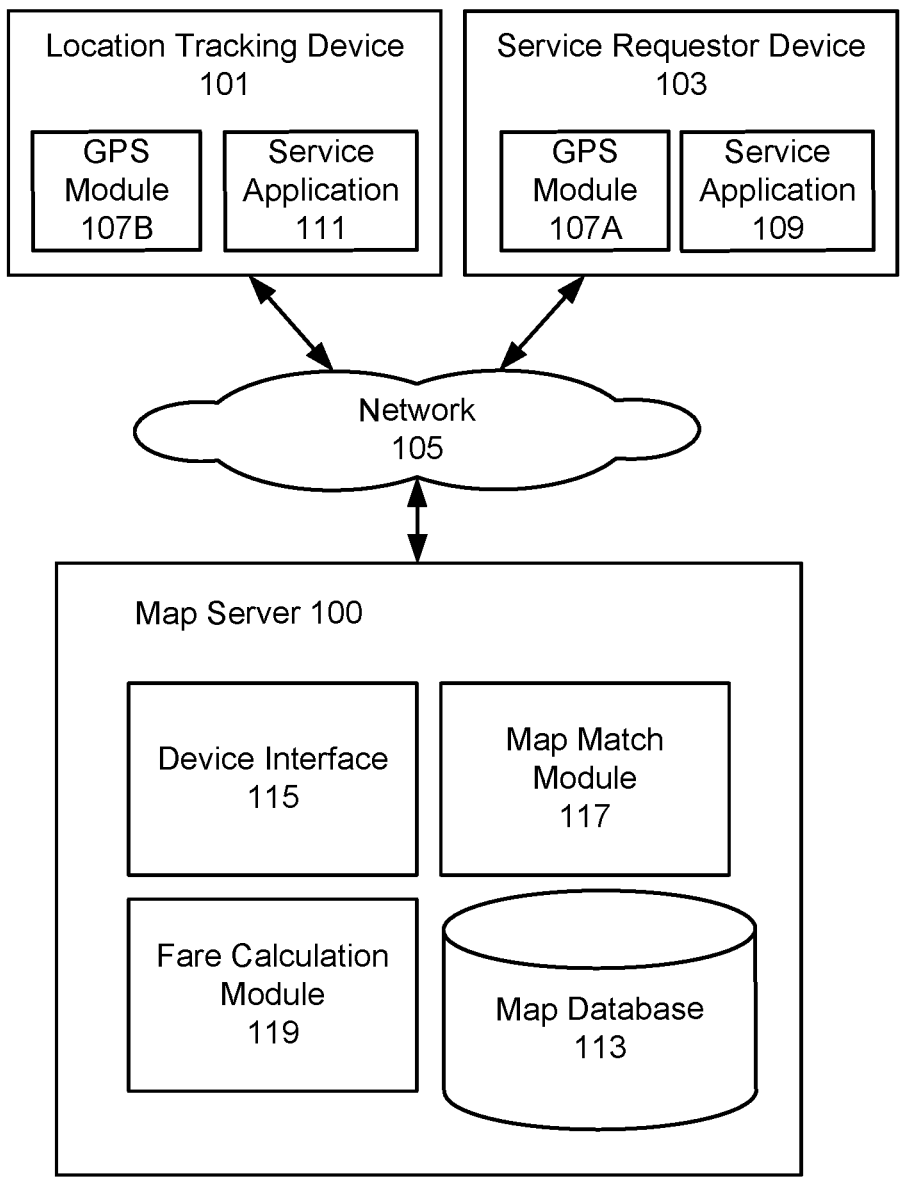
FIG. 1 illustrates a system architecture of a mapping system in accordance with one embodiment.

FIG. 1 illustrates a system architecture of a computing system(s) that provides a network service (referred to herein as a map server 100) in accordance with one embodiment. In particular, FIG. 1 illustrates a detailed view of modules within a map server 100, a location tracking device 101, and a service requestor device 103 according to one embodiment. Some embodiments of the map server 100, the location tracking device 101, and the service requestor device 103 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the map server 100 implements a network service, such as an arrangement service, which enables services to be arranged between parties such as between the users of the location tracking device 101 and the service requestor device 103. As described herein, a location tracking device 101 can correspond to a mobile computing device, such as a smartphone, that is operated by a service provider, such as a driver of a vehicle, or can correspond to an on-board computing system of a vehicle. The map server 100 can also correspond to a set of servers, in some examples, and can operate with or as part of another system that implements network services. An example of the services includes arranging a transport service or a delivery service between a service requestor and a service provider. In the context of the discussion herein, an operator of a transportation vehicle (e.g., the service provider) provides the service of transporting a person (e.g., the requestor) to a destination requested by the person. In one embodiment, transportation vehicles include vehicles, such as cars and motorcycles, as well as public transportation vehicles such as trains, light rail, buses, etc.

In one embodiment, the transportation of a person from a starting location to a destination location is referred to as a trip. Generally, the map server 100 calculates fares for trips. A fare is a monetary payment from a service requestor to a service provider in exchange for the service provider transporting the service requestor to a destination location. The map server 100 may calculate the fare for a trip based on the distance traveled during the trip (and/or based on a duration of the trip, any applicable tolls, fees, etc.). The map server 100 determines the distance traveled during the trip using geographic information received from the location tracking device 101 (e.g., such as after completion of the trip).

The map server 100 receives (e.g., periodically) geographic information from a location tracking device 101 included in a transportation vehicle as the transportation vehicle moves its position. The geographic information includes geographic points that describe a trip of the transportation vehicle. In one embodiment, the geographic information is global positioning system (GPS) information. Throughout the description, geographic information is referred to as "GPS data" or "GPS points," but the description herein can be applied to any other type of geographic coordinate system.

The GPS data received from the location tracking device 101 may include noise, in the form of erroneous data. Since the GPS data includes noise, the GPS data may not accurately reflect the true position of the location tracking device 101 at the time the GPS data was measured. The noise in the GPS data may result from a lack of an accurate GPS signal received by the location tracking device due to buildings blocking the GPS signal, for example. The map server 100 may identify for each GPS point represented in the GPS data one or more candidate GPS points (e.g., from a map database) that may represent the actual location where the GPS point was measured by the location tracking device 101. According to an example, the map server 100 calculates a shortest path from the starting location of the trip to the destination location of the trip using the identified candidate GPS points. Generally, the map server 100 applies an algorithm, such as an iterative bounded A* algorithm, to the candidate GPS points in order to calculate the shortest path from the starting location of the trip to the destination location of the trip as described below.

As shown in FIG. 1, the map server 100 is in communication with the location tracking device 101 and the service requestor device 103 via a network(s) 105. In one embodiment, the network 105 is the Internet or any combination of a LAN, a MAN, a WAN, a mobile, wired or wireless network, a private network, or a virtual private network. While only a single location tracking device 101 and a single service requestor device 103 are shown in FIG. 1, any number of location tracking devices 101 can be in communication with the map server 100.

In one embodiment, the service requestor device 103 is an electronic device (e.g., a smart phone) of a person that requested a trip. The service requestor device 103 is used by the person to request a trip from a starting location to a destination location via a service application 109 included in the service requestor device 103. The service application 109 allows the user of the service requestor device 103 to submit a trip request, which the map server 100 then processes in order to select an operator of a transportation vehicle.

According to examples, the trip request may include (i) a user identifier (ID), (ii) a pickup location (e.g., a location identifier specified by the user or a location identifier of the current position of the service requestor device 103 as determined by a GPS module 107A included in the service requestor device 103), (iii) a destination location, and/or (iv) a vehicle type. For example, the GPS module 107A uses sensors (e.g., a GPS receiver) included in the service requestor device 103 to determine the position of the service requestor device 103 at various instances in time. In one embodiment, the current position of the service requestor device 103 is represented by a location identifier such as latitude and longitude coordinates. The current position of the service requestor device 103 is also associated with a time stamp indicating the time and the date in which the GPS module 107A measured the current position of the service requestor device 103. Alternatively, the pickup location of the service requestor device 103 may be manually inputted into the service requestor device 103 by the user of the device 103, such as by selecting a location on a map or in the form of an address including at least a street number and street name.

The arrangement service, which is implemented by the map server 100 and/or other servers or systems, can receive the trip request over the network 105 and can select an operator or service provider for the requestor. In one example, the arrangement service can (i) identify a pool of service providers that are available to provide the requested service and satisfy one or more conditions (e.g., have the specified vehicle type, and/or are within a predetermined distance or estimated travel time away from the pickup location), (ii) select a service provider from the pool of service providers, and (iii) transmit an invitation to the location tracking device 101 of the service provider. The invitation can include the pickup location, so that the selected service provider can navigate to the pickup location for initiating the trip for the requestor. If the selected service provider accepts the invitation by providing input on the location tracking device 101, the map server 100 can notify the service requestor device 103 accordingly.

In one embodiment, the location tracking device 101 is an electronic device (e.g., a smart phone) located within the transportation vehicle used to complete trips. The location tracking device 101 includes a service application 111. The service application 111 displays, on the location tracking device 101, information about a trip that the service provider has agreed to provide, such as the pickup location, and/or navigation and/or mapping information instructing the service provider to travel to the pickup location. As referred to herein, the pickup location may be the current location of the service requestor device 103 or a location specified by the user of the service requestor device 103. The service application 111 may also display, on the location tracking device 101, the destination for the assigned trip if provided by the user of the service requestor application 111.

The location tracking device 101 includes a GPS module 107B. The GPS module 107B uses one or more sensors of the location tracking device 101 to identify GPS data of the transportation vehicle as the transportation vehicle moves along one or more roads to complete a trip. The GPS data of the transportation vehicle is representative of the transportation vehicle's position at different instances in time during a trip. For example, at time T1, the location tracking device 101 can be at a particular GPS location, identified by a location identifier (e.g., latitude and longitude coordinates) and a time stamp indicative of the time and date when the location tracking device 101 measured its current position. If the transportation vehicle is moving, at time T2 the location tracking device 101 can be at a different GPS location. In this manner, the location tracking device 101 periodically measures the current position of the transportation vehicle (e.g., every three seconds, every four seconds, etc.) and periodically provides GPS data that is representative of the position of the transportation vehicle over time to the map server 100. Alternatively, the location tracking device 101 may provide GPS data whenever new or updated measurements of the current position of the transportation vehicle are taken or are available.

Each of the service applications 111 and 109 respectively stored at the location tracking device 101 and the service requestor device 103 can include or use an application programming interface (API) to communicate data with the map server 100. The API can provide access to the map server 100 via secure access channels over the network 105 through any number of methods, such as web based forms, programmatic access via RESTful APIs, Simple Object Access Protocol (SOAP), remote procedure call (RPC), scripting access, etc., while also providing secure access methods including key-based access to ensure the map server 100 remains secure and only authorized users, service providers, and/or third parties can gain access to the map server 100

As shown in FIG. 1, the map server 100 comprises or is in communication with a map database 113. The map database 113 stores a variety of map spatial databases. Map spatial databases are queryable databases identifying different points (e.g., having a latitude and longitude, and/or an altitude) along paths of trips that a given transportation vehicle can use, and information about how the different points connect with other points. Some commercially available map spatial databases include points identifying locations of interests or landmarks.

With respect to vehicles, a vehicle map database can include points corresponding to locations on known road networks such as roadways, highways, freeways, etc. The vehicle map database may also include other information related to road networks, such as intersections, one way streets, how the different roads and streets connect to each other, etc. Similarly, with respect to airplanes, an airplane map system spatial database can include points corresponding to locations along flight paths and what points are boundaries for no flight zones, while for trains, a train's map system spatial database can include points corresponding to locations on railroads and railways, and where/how the railroads connect. Additional map databases can be created or modified in the map database 113 as a result of real life updates and changes.

The device interface 115 manages communications between the map server 100, and the location tracking device 101 and the service requestor device 103 over the network 105. The device interface 115 receives trip requests from the service requestor device 103 and transmits invitations to the location tracking device 101. In addition, the device interface 115 receives trip acceptances from the location tracking device 101 and routes notifications of the trip acceptances to the service requestor device 103. In one embodiment, the device interface 115 receives GPS data and/or state information about the service provider or service application 111 from the location tracking device 101 as the transportation vehicle moves to complete a trip and forwards the GPS data to a map match module 117 included in the map server 100.

The map match module 117 determines a path of one or more known roadways (e.g., streets, freeways, and/or highways) that the transportation vehicle uses to complete a trip. The map match module 117 determines the path of travel of the transportation vehicle using the GPS data received from a location tracking device 101 included in the transportation vehicle. In one embodiment, the path is calculated as the GPS data is received from the location tracking device 101. That is, as the GPS data is received from the location tracking device 101, the map match module 117 identifies different roadways that the transportation vehicle may use to complete the trip. In another embodiment, the map match module 117 calculates the path at the completion of the trip or at intermediate times during the trip, at the discretion of the implementer. In one embodiment, the path of travel of the transportation vehicle used to complete a trip is considered the map matched path of travel of the transportation vehicle. As the map match module 117 receives GPS data at different instances in time from the location tracking device 101 included in the transportation vehicle, the map match module 117 attempts to identify which roadways the transportation vehicle is traveling on.

In one embodiment, the map match module 117 queries the map database 113 for a vehicle map database. The map match module 117 uses the vehicle map database to identify one or more candidate GPS points of the vehicle map database that corresponds to a given GPS point included in the GPS data received from the location tracking device 101. A candidate GPS point is a point having a latitude and longitude corresponding to a known location in the vehicle map database. For example, in the vehicle map database a candidate GPS point can be a point that corresponds to a location on a street or at an intersection between multiple streets. As a result, the map match module 117 can identify a candidate GPS point that best matches each GPS point included in the received GPS data.

In one embodiment, the map match module 117 identifies one or more candidate GPS points for a given GPS point because the GPS point may not be accurate due to noise in the GPS signal received by the location tracking device 101. As the location tracking device 101 moves and provides updated GPS data at different instances in time to the map match module 117 or at the completion of the trip, the map match module 117 continues to identify candidate GPS point(s) for each GPS point at each instance in time. Alternatively, the map match module 117 may identify candidate points for a subset of the GPS points included in the GPS data. The map match module 117 determines the map matched path of travel based on the identified candidate points in the vehicle map database.

While some examples described herein describe the location tracking device 101 as providing GPS data during a trip, in other examples, the location tracking devices 101 can also provide the GPS data to the map server 100 while the service provider is on-duty and/or available to receive invitations for trips or on route to the pickup location of a requestor, but not yet providing a trip. In such examples, the map match module 117 can determine the map matched path of travel of the location tracking devices 101 in order to illustrate the positions and/or movements of the vehicles as graphic icons moving on roadways or freeways on a map user interface (e.g., map tiles). Such map user interfaces can be displayed by the service applications 111 to enable requestors to see where the vehicles are in their general geographic area or with respect to their current or pickup locations.

Figure 2:
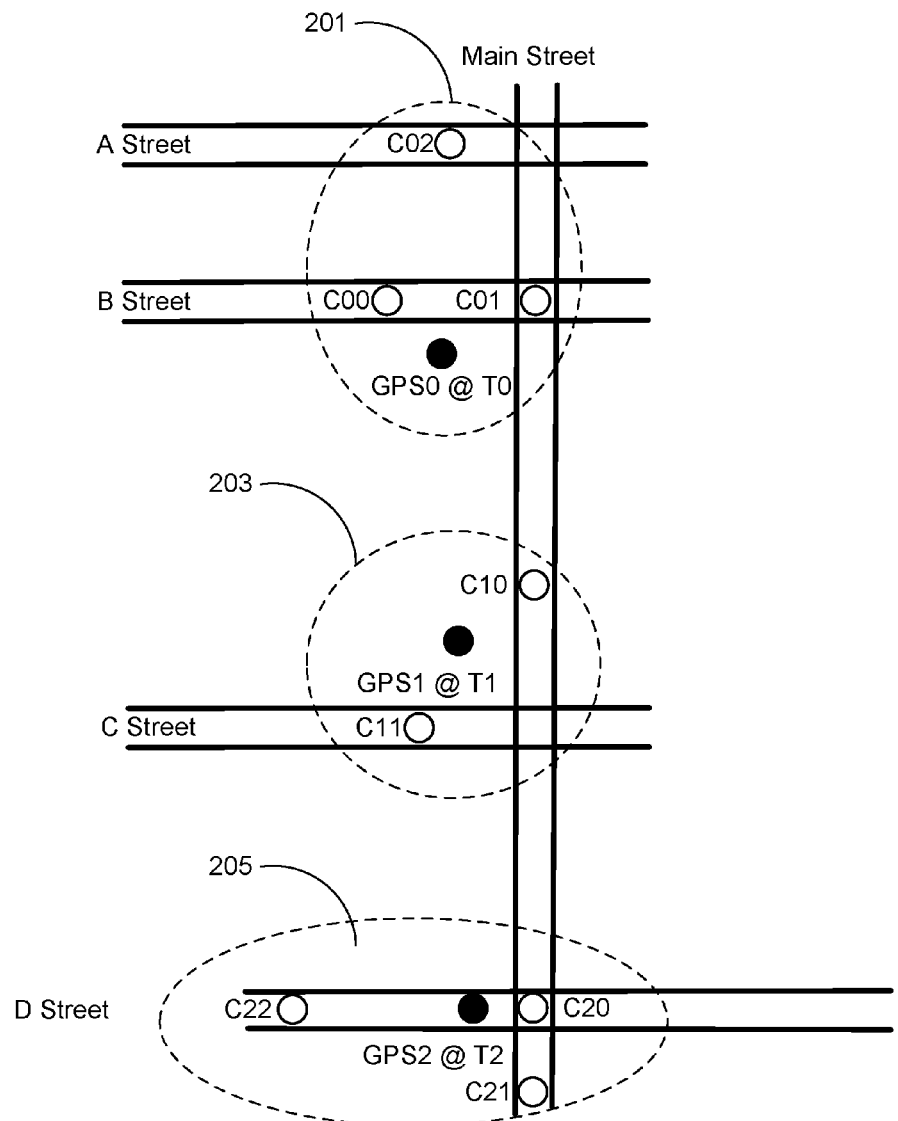
FIG. 2 illustrates geographic information associated with a trip according to one embodiment.

For example, FIG. 2 illustrates GPS data received from a location tracking device 101 according to one embodiment. While FIG. 2 illustrates only three GPS points received from the location tracking for ease of description, any number of GPS points may be received by the map match module 117.

In FIG. 2, the map match module 117 receives from the location tracking device 101 at time T0 its position represented by GPS point GPS0. Although the location tracking device 101 may be traveling on a road, due to GPS measurement inaccuracies GPS0 may not necessarily be shown on a road as illustrated in FIG. 2. Similarly, at time T1 the map match module 117 receives from the location tracking device 101 its position represented by GPS point GPS1. Lastly, at time T2 the map match module 117 receives from the location tracking device 101 its position represented by GPS point GPS2.

For each GPS point received from the location tracking device 101, the map match module 117 identifies one or more candidate GPS points in the vehicle map database that may represent the actual location of the location tracking device 101 at the times when GPS points GPS0, GPS1, and GPS2 were measured by the location tracking device 101. The map match module 117 may identify the candidate points for a GPS point by identifying GPS points from the vehicle map database that are within a threshold distance (e.g., 10 meters) from the received GPS point.

For example, the map match module 117 may identify candidate GPS points 201 for GPS point GPS0. Candidate GPS points 201 include candidate GPS point C00, candidate GPS point C01, and candidate GPS point C02. The map match module 117 may also identify candidate GPS points 203 for GPS point GPS1 that include candidate GPS point C10 and candidate GPS point C11. Lastly, the map match module 117 identifies candidate GPS points 205 for GPS point GPS2 that include candidate GPS point C20, candidate GPS point C21, and candidate GPS point C22. The map match module 117 may identify candidate GPS points for each GPS point responsive to receiving the GPS point from the location tracking device 101 or after the trip is completed.

In one embodiment, the map match module 117 applies an iterative bounded A* algorithm to determine the shortest path of travel based on the identified candidate GPS points for each GPS point received from the location tracking device 101. In one embodiment, the determined path of travel of the transportation vehicle used to complete a trip is considered the map matched path of travel. The determined path of travel is considered to be "map matched" since the path of travel matches known road segments included in the vehicle map database.

Figure 3:
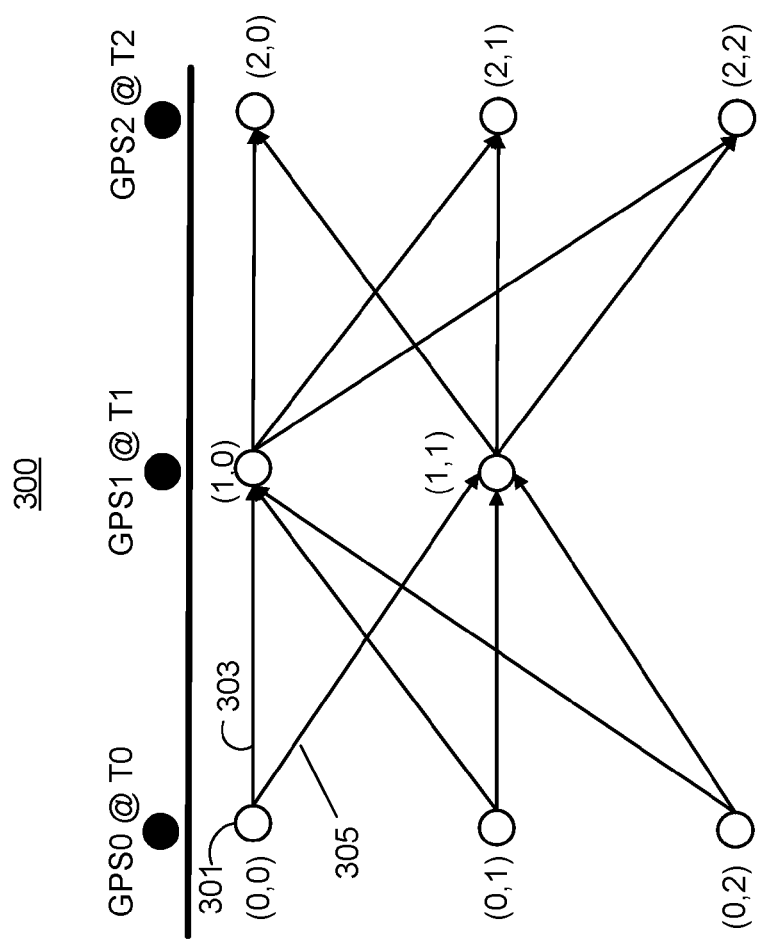
FIG. 3 illustrates a trellis graph of the geographic information according to one embodiment.

FIG. 3 illustrates a trellis graph 300 that represents the candidate GPS points of identified by the map match module 117. As shown in FIG. 3, the trellis graph 300 includes a plurality of candidate GPS points (T, N) where T represents an instance in time when the associated GPS point was measured by the location tracking device 101 and N represents the candidate GPS point identifier. T and N are any integers such as 0, 1, 2, 3, etc. For example, candidate GPS point (0, 0) represents candidate GPS point 0 at time T0 in FIG. 3 (e.g., node 301). The candidate GPS points in the trellis graph 300 are arranged such that the points are ordered into vertical slices of time where each candidate GPS point at each time is connected to at least one candidate GPS point at an earlier and at least one candidate GPS point at a later time except for the candidate GPS point associated with the earliest and latest time in the trellis graph (e.g., time T0 and time T2). For example, at time T0 the candidate GPS points 201 for GPS0 are arranged under time T0 in the trellis graph 300. Similarity, at time T1 the candidate GPS points 203 for GPS1 are arranged under time T1 in the trellis graph 300. Lastly, at time T2 the candidate GPS points 205 for GPS2 are arranged under time T2 in the trellis graph 300.

Note that the map match module 117 does not actually generate a trellis graph. The map match module 117 makes a logical determination of the trellis graph rather than actually construct the trellis graph. The trellis graph 300 is illustrated for description purposes and describes how the map match module 117 processes the GPS data received from the location tracking device 101.

As shown in FIG. 3, each candidate GPS point is connected to all other candidate GPS points that are directly adjacent in time in the trellis graph 400 to the candidate GPS point via edges. For example, candidate GPS point (0,0) is connected to candidate GPS point (1,0) and candidate GPS point (1,1) in the trellis graph 300 respectively via edges 303 and 305. In one embodiment, each candidate GPS point in the trellis graph 300 is associated with an emission probability. The emission probability describes the distance (e.g., in meters) between the candidate GPS point and its associated GPS point. For example, the emission probability for candidate GPS point (0,0) is a decreasing function of the distance between the candidate GPS point (0,0) and GPS point GPS0. Generally, the larger the distance between the candidate GPS point and the raw GPS point, the smaller the emission probability. The map match module 117 may calculate the emission probability for each candidate GPS point in the trellis graph 300 by calculating the straight line distance between the candidate GPS point and the associated GPS point.

In one embodiment, each edge that connects together a pair of candidate GPS points in the trellis graph is associated with a transition probability. The transition probability describes the straightness of the route between the pair of candidate GPS points. The map match module 117 may calculate the transition probability for an edge according to the following equation:

$$\text{transition\_probability}[(T_i,N_n),(T_{i+1},N_j)] = \exp(-\text{abs}(\text{routing\_distance}[(T_i,N_n),(T_{i+1},N_j)] - \text{straight\_line\_distance}[(T_i,N_n),(T_{i+1},N_j)]))$$

The routing distance between a pair of candidate GPS points that are connected together by the edge under evaluation describes the distance between the pair of GPS points $[(T_i, N_n)$ and $(T_{i+1}, N_j)]$ using the road network described by the map vehicle database. The straight line distance between a pair of candidate GPS points connected by the edge describes the great circle distance (e.g., the orthodromic distance) between the two candidate GPS points $[(T_i, N_n)$ and $(T_{i+1}, N_j)]$. When the routing distance is equal to the straight line distance, the transition probability is at is maximal value (e.g., 1). Otherwise, as the value of the routing distance and the straight line distance diverse, the transition probability decreases in value. Generally, the transition probability of an edge is computationally expensive to calculate compared to the emission probability of a candidate GPS point and causes the map server 100 to consume more computing resources when calculating the transition probability of an edge compared to calculating an emission probability of a candidate GPS point.

In one embodiment, the map match module 117 transforms the map matching problem into a shortest path problem by converting the emission probability to a node cost for each candidate GPS point in the trellis graph and by converting any calculated transition probabilities into an edge cost. To convert the emission probability of a candidate GPS point to a node cost for the candidate GPS point, the map match module 117 applies the negative log to the emission probability of the candidate GPS point. Furthermore, the map match module 117 converts the transition probability of an edge to an edge cost by applying the negative log to the transition probability of the edge.

In the conventional A* algorithm, the edge cost of each edge in the trellis graph 300 are required in order to apply the A* algorithm to identify the shortest path from a source location to the destination location in the trellis graph 300. However, calculating the edge cost for each edge is computationally expensive (e.g., and/or time extensive).

Rather than apply the traditional A* algorithm to the trellis graph 300, the map match module 117 applies an iterative bounded A* algorithm to the trellis graph 300 to identify the shortest path from a source location to the destination location in the trellis graph 300. In one embodiment, the iterative bounded A* algorithm is iteratively applied to sub-graphs of the trellis graph to identify shortest path from a source location to the destination location in the trellis graph 300. As described below, the map match module 117 only calculates the edge cost for a subset (i.e., a portion) of the edges in the trellis graph thereby reducing the usage of the computing resources of the map server 100.

Figure 4A:
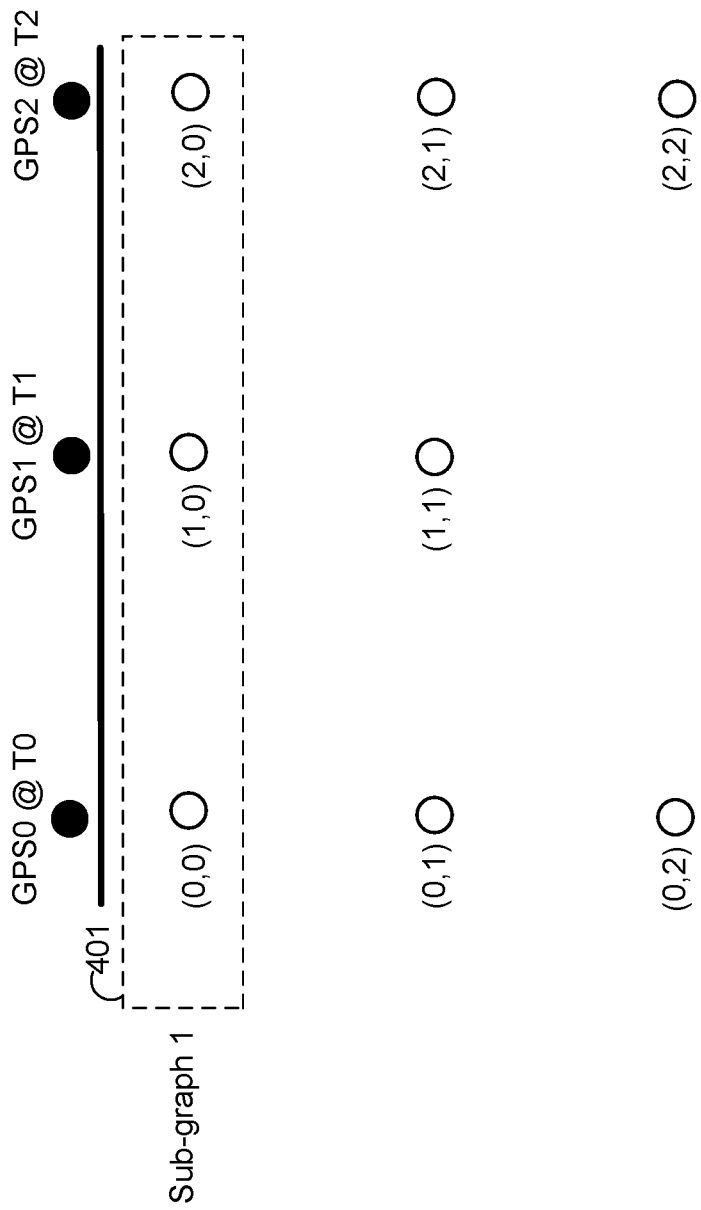

In one embodiment, the map match module 117 identifies sub-graphs of the trellis graph 300. To identify the sub-graphs, in one embodiment the map match module 117 first sorts the candidate GPS points in each time period by their emission probabilities. The map match module 117 may sort the candidate GPS points in the increasing order of each candidate GPS point's distance to its corresponding raw GPS point. For example, at time T0, the map match module 117 sorts the candidates (0,0), (0,1), and (0,2) in the increasing order of their distances to the raw GPS point GPS0. Thus, candidate GPS point (0,0) has the smallest distance to GPS point GPS0 and thus the largest emission probability whereas candidate GPS point (0,2) has the largest distance to GPS point GPS0 and thus has the smallest emission probability. The first sub-graph identified by the map match module 117 is the simplest sub-graph from amongst the identified sub-graphs. The first sub-graph includes only the first set of candidate GPS points (T, N) across time where T=0, 1, 2, etc. and N=0. FIG. 4A illustrates the first sub-graph 401 of the trellis graph 300. The first sub-graph 401 includes only candidate GPS point (0,0), candidate GPS point (1,0), and candidate GPS point (2,0).

Each subsequently identified sub-graph is more complex than the previously identified sub-graph. Each subsequently identified sub-graph includes all the candidate GPS points from the previously identified sub-graphs in addition to the next set of additional candidate GPS points (T, N+1) where T and N=0, 1, 2, etc. For example, FIG. 4B illustrates the second sub-graph 403 of the trellis graph 300. The second sub-graph 403 includes the candidate GPS points from the first sub-graph 401 in addition to the second set of candidate GPS points (T, 1) across time. The second sub-graph 503 includes node (0, 0), node (1,0), node (2,0) from the first sub-graph 401 in addition to candidate GPS point (0, 1), candidate GPS point (1,1), and candidate GPS point (2,1).

FIG. 4C illustrates the third sub-graph 405 of the trellis graph 300. The third sub-graph 405 includes the candidate GPS points from the second sub-graph 403 in addition to the third set of candidate GPS points (T, 2) across time. The third sub-graph 405 includes candidate GPS point (0,0), candidate GPS point (1,0), candidate GPS point (2,0), candidate GPS point (0,1), candidate GPS point (1, 1) and candidate GPS point (2, 1) from the second sub-graph 403 in addition to candidate GPS point (0,2) and candidate GPS point (2,2).

FIGS. 5A to 7 describe the application of the iterative bounded A* algorithm to the identified sub-graphs described above with respect to FIGS. 4A to 4C according to one embodiment. Generally, the map match module 117 identifies the shortest path from the first sub-graph and iteratively evaluates each subsequent sub-graph to try to identify an even shorter path as will be described below.

Figure 5A:
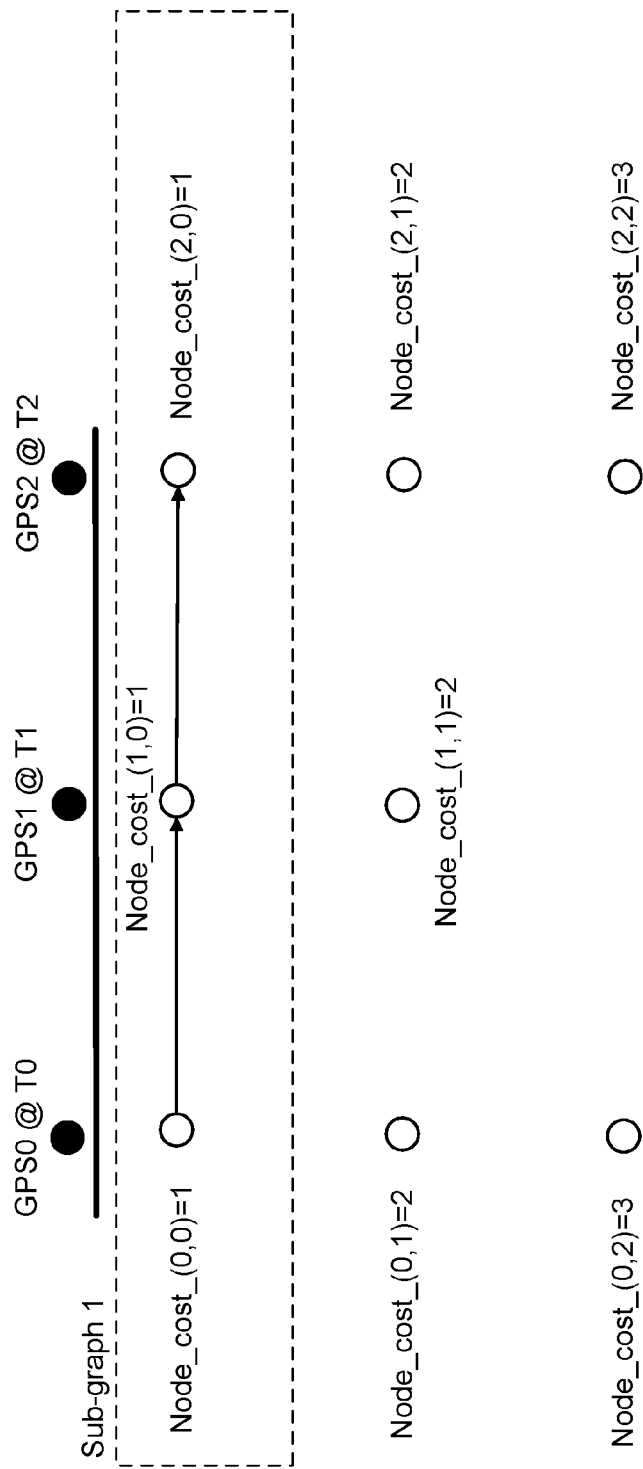
FIGS. 5A-5D illustrate an evaluation of the sub-graph shown in FIG. 4A according to one embodiment.

With respect to FIG. 5A, the map match module 117 calculates the node cost for each candidate GPS point included in the first sub-graph 401. Alternatively, the map match module 117 calculates the node cost for all the candidate GPS points included in the trellis graph 300 since the calculation of the node cost is not computationally expensive. FIG. 5A shows the node costs for all the nodes.

As mentioned above, the map match module 117 calculates the node cost for a candidate GPS point by first calculating the emission probability for the candidate GPS point. The emission probability describes the distance (e.g., in meters) between the candidate GPS point and the associated GPS point received from the location tracking device 101. The map module 201 converts the emission probability for each candidate GPS point by applying the negative log to the emission probability of the candidate GPS point. As a result of the calculation, the node costs for the candidate GPS points included in the first sub-graph 401 are as follows:

Node_cost_(0, 0)=1;
Node_cost_(1, 0)=1; and
Node_cost_(2, 0)=1.

Figure 5B:
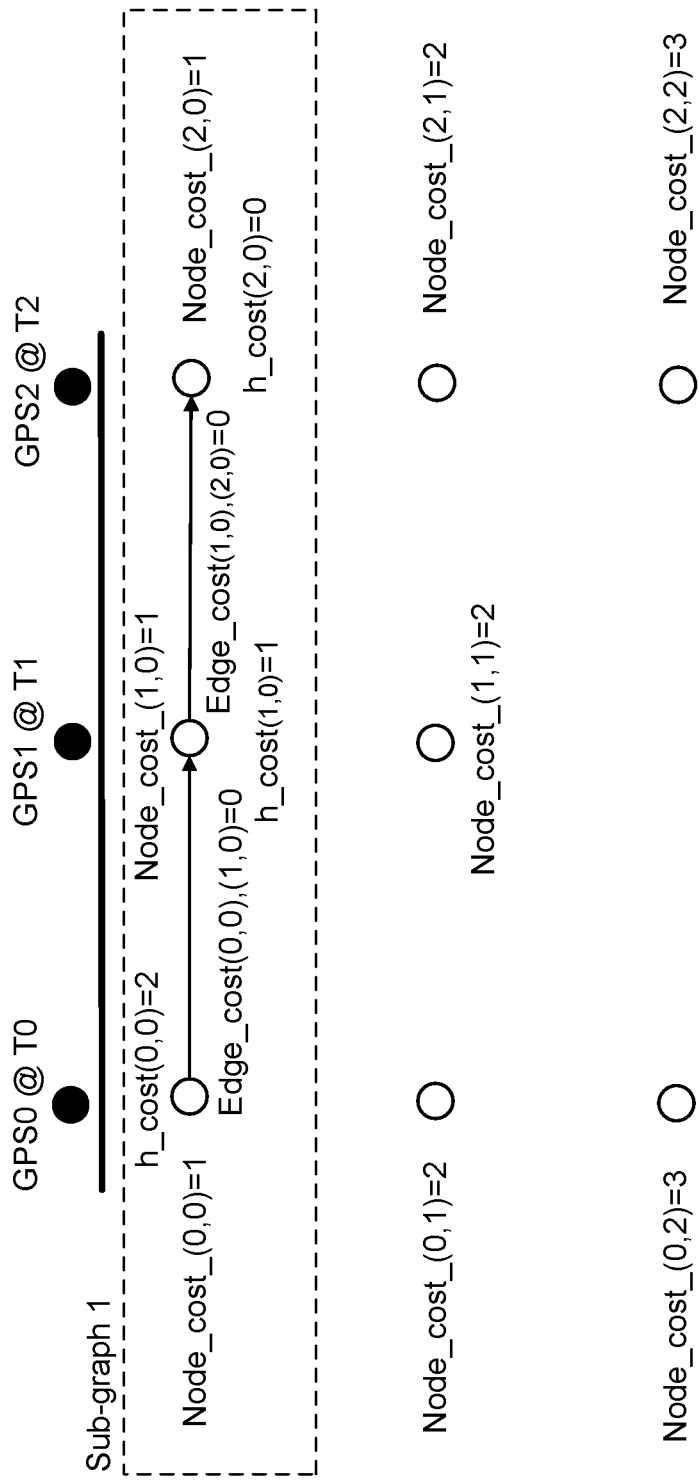

Next, the map match module 117 calculates a heuristic cost for each candidate GPS point in the first sub-graph 401 as shown in FIG. 5B. The heuristic cost for a candidate GPS point estimates the cost of the cheapest path (e.g., the shortest path) from a source location (e.g., candidate GPS point (0,0)) to the destination location (e.g., candidate GPS point (2,0)) in the sub-graph. In one embodiment, the heuristic cost for any candidate GPS point associated with the destination location is zero. Thus, the heuristic cost (e.g., h_cost(2,0)) for candidate GPS point (2,0) is zero since candidate GPS point (2,0) is associated with the destination location.

For each candidate GPS point that is not associated with the destination location, the map match module 117 determines the heuristic cost for the candidate GPS point (T, N) based on a sum of 1) the node cost of a candidate GPS point (T+1, M) in the sub-graph that is connected to the candidate GPS point via an edge, 2) the edge cost of the edge connecting together the candidate GPS point (T, N) and the candidate GPS point (T+1, M) in the sub-graph, and 3) the heuristic cost of the candidate GPS point (T+1, M). If the candidate GPS point is connected to multiple candidate GPS points, the map match module 117 selects the heuristic cost resulting in the smallest value, as will be described below.

To calculate the heuristic cost of candidate GPS point (1,0), the map match module 117 sums 1) the node cost of candidate GPS point (1,0), 2) the edge cost of the edge connecting together candidate GPS point (1,0) and candidate GPS point (2,0), and 3) the heuristic cost of candidate GPS point (2,0). In one embodiment, if the edge cost of an edge has not been calculated by the map match module 117 (i.e., the edge is unevaluated), the map match module 117 assumes a zero cost for the unevaluated edge. Since the edge connecting together candidate GPS point (1,0) and candidate GPS point (2,0) is unevaluated, the edge cost is zero. Thus, the heuristic cost of 1 for candidate GPS point (1,0) is calculated as follows:

$$h\_cost(1,0) = Node\_cost\_(1,0) + Edge\_cost(1,0),(2,0) + h\_cost(2,0)$$

$h\_cost(1,0)=1+0+0$ $h\_cost(1,0)=1$

Figure 5C:
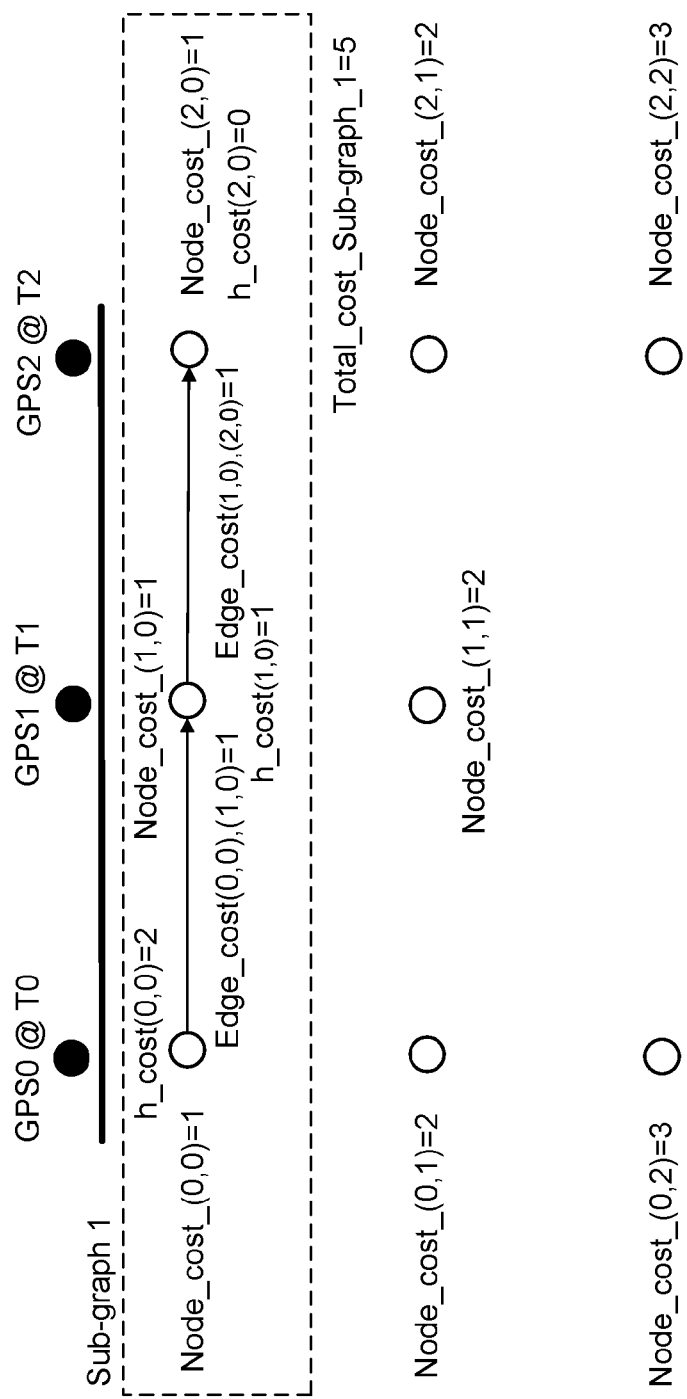

Similarly, to calculate the heuristic cost of candidate GPS point (0,0), the map match module 117 sums 1) the node cost of candidate GPS point (0,0), 2) the edge cost of the edge connecting together candidate GPS point (0,0) and candidate GPS point (1,0), and 3) the heuristic cost of candidate GPS point (1,0). Since the edge connecting together candidate GPS point (0,0) and candidate GPS point (1,0) is unevaluated, the edge cost is zero. Thus, the heuristic cost of 2 for candidate GPS point (0,0) is calculated as follows:

$h\_cost(0,0)=\text{Node\_cost\_}(0,0)+\text{Edge\_cost}(0,0),(1,10)+h\_cost(1,0)$ $h\_cost(0,0)=1+0+1$ $h\_cost(0,0)=2$ Next, the map match module 117 applies the A* algorithm to the first sub-graph 401 to identify the shortest path in the first sub-graph 401 as shown in FIG. 5C. Applying the A* algorithm to the first sub-graph 401 includes calculating the edge costs of all the edges included in the first sub-graph 401 as the A* algorithm traverses the first sub-graph 401. As mentioned above, the map match module 117 calculates the edge cost by calculating a transition probability of the edge and applying the negative log to the transition probability. Calculating the edge cost is computationally expensive, but is required for at least the first sub-graph 401 in one embodiment. Since the first sub-graph 401 includes only one candidate GPS point for each GPS point, the first sub-graph 401 includes only a single possible path from the source location to the destination location as shown in FIG. 5C.

In one embodiment, the map match module 117 calculates the total cost of the path in the first sub-graph 401 according to the calculated node costs and edge costs included shown in FIG. 5C. The map match module 117 calculates the total cost of 5 for the path in the first sub-graph 401 according to the following:

$\text{Total\_cost}_{sub}\text{-graph}\_1=\text{Node\_cost\_}(0,0)+\text{Edge\_cost}(0,0),(1,0)+\text{Node\_cost\_}(1,0)+\text{Edge\_cost}(1,0),(2,0)+\text{Node\_cost\_}(2,0)$ $\text{Total\_cost}_{sub}\text{-graph}\_1=1+1+1+1+1$ $\text{Total\_cost}_{sub}\text{-graph}\_1=5$ Since only a single path has been identified so far, the map match module 117 declares the identified path from the first sub-graph 401 as the "best" path. The identified path is the "best" such that it has the least cost thereby representing the shortest path identified between the source location and the destination location of the trip.

After identifying the "best" path from the first sub-graph 401, the map match module 117 iteratively evaluates the identified sub-graphs according to one embodiment. By iteratively evaluating each sub-graph, the map match module 117 attempts to improve upon the "best" path. That is, the map match module 117 attempts to identify a path in the other sub-graphs that has a lower cost than the currently established "best" path applying the processes described above with respect to the first sub-graph 401.

Figure 5D:
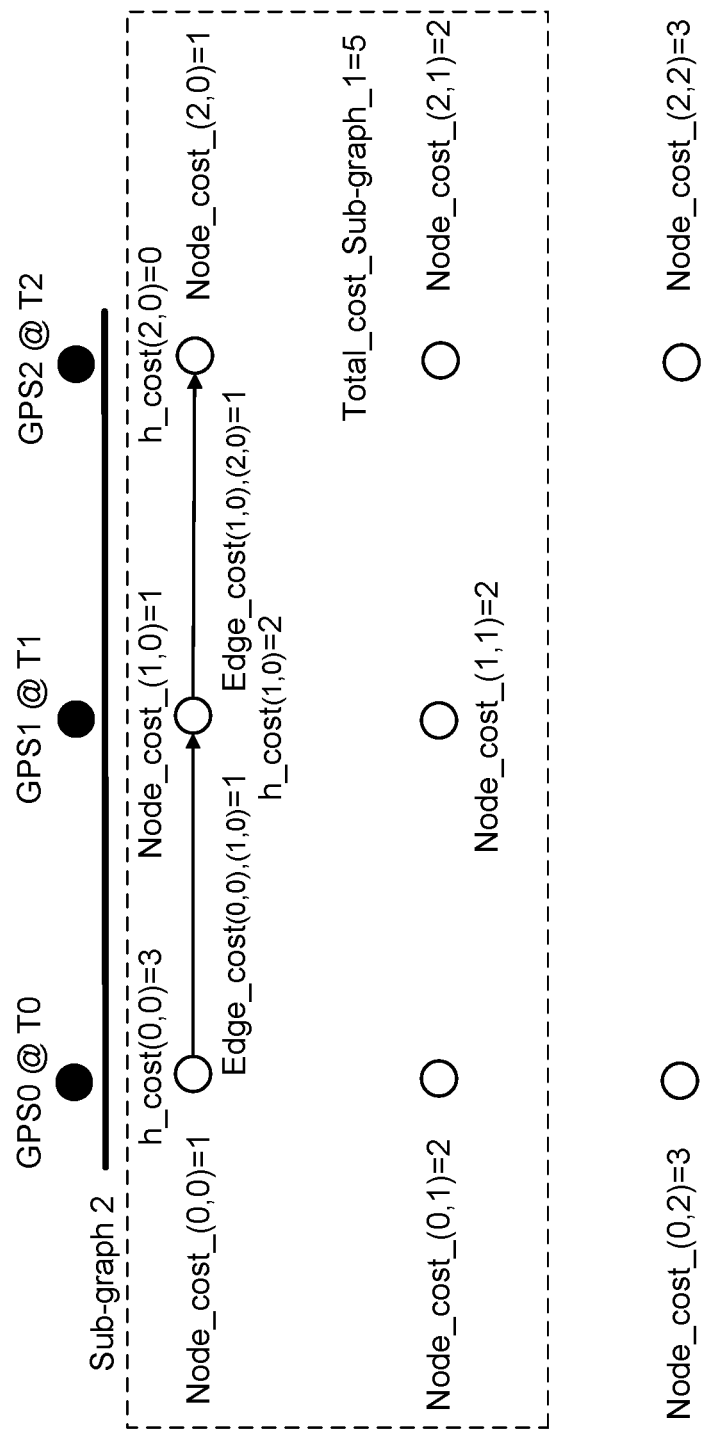

For example, the map match module 117 next evaluates the second sub-graph 403. In one embodiment, the map match module 117 first updates the heuristic costs of the candidate GPS points included in the second sub-graph 403 to account for the edge costs in the first sub-graph 401 that were calculated as a result of applying the A* algorithm to the first sub-graph 401 as shown in FIG. 5D. The map match module 117 calculates the heuristic cost for each candidate GPS point in the first sub-graph 401. The updated heuristic costs for the candidate GPS points in the second sub-graph 403 are used by the map match module 117 in the bounded A* iteration of the second sub-graph 403. To calculate the heuristic cost of candidate GPS points (0,0) in the second sub-graph, the map match module 117 follows similar steps for calculating the heuristic cost for candidate GPS point (0,1). To calculate the heuristic cost of candidate GPS point (1,0), the map match module 117 follows similar steps for calculating the heuristic cost for candidate GPS point (1,1).

Figure 6A:
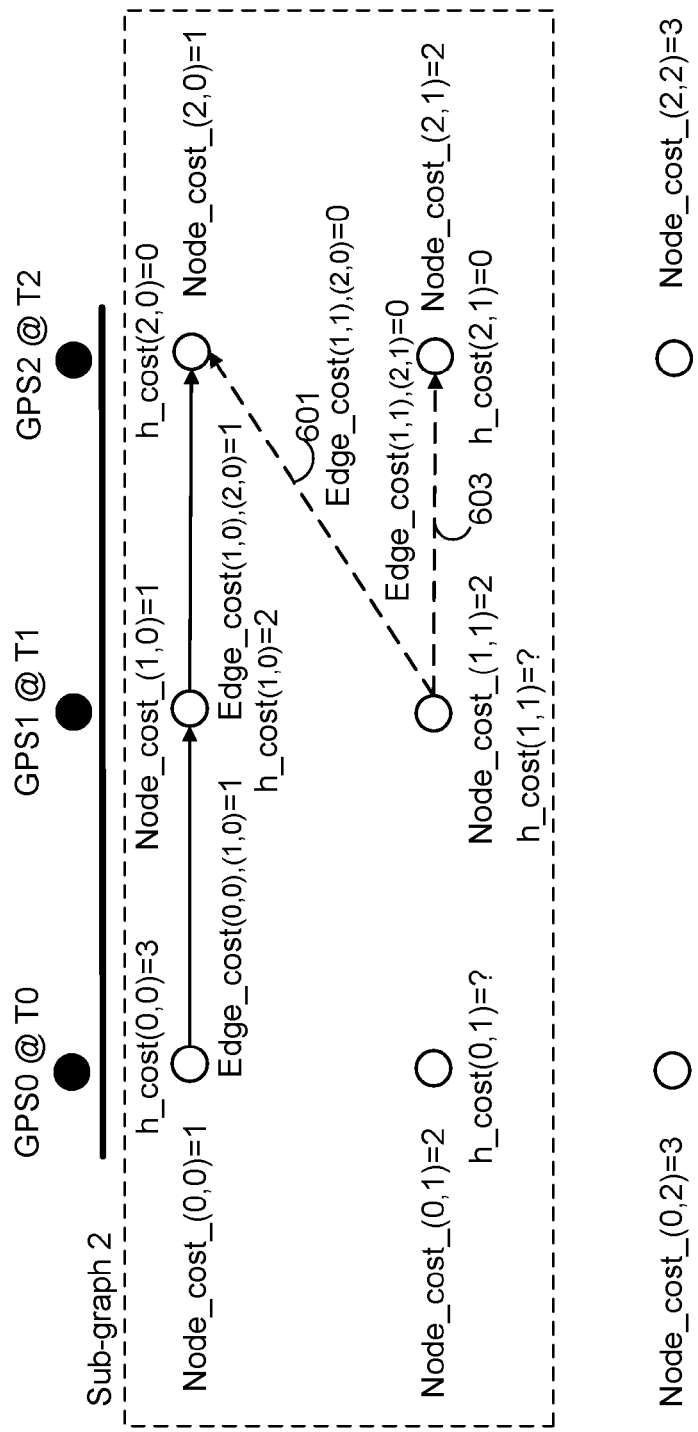
FIGS. 6A-6F illustrate an evaluation of the sub-graph shown in FIG. 4B according to one embodiment.

With respect to FIG. 6A, similar to sub-graph 1, the map match module 117 identifies the heuristic cost for the candidate GPS points (T,0) and the additional candidate GPS points (T, 1) included in the second sub-graph 403 where T=0, 1, 2, etc. That is, the map match module 117 identifies the heuristic cost for candidate GPS point (0, 0), candidate GPS point (0, 1), candidate GPS point (1, 0), candidate GPS point (1, 1), candidate GPS point (2, 0), and candidate GPS point (2, 1). As mentioned above, the heuristic cost for any candidate GPS point associated with the destination location is 0. Thus, the heuristic cost h_cost(2, 0) for candidate GPS point (2, 0) is zero, and the heuristic cost h_cost(2, 1) for candidate GPS point (2, 1) is also zero.

For each candidate GPS points in sub-graph 2 that is not associated with the destination location, the map match module 117 determines the heuristic cost for each candidate GPS point (T, N) based on a sum of 1) the node cost of the candidate GPS point (T+1, M) in the sub-graph that is connected to the candidate GPS point via an edge 2) the edge cost of the edge connecting together the candidate GPS point (T, M) and the candidate GPS point (T+1, M) in the sub-graph and 3) the heuristic costs of the candidate GPS points (T+1, M) in the second sub-graph 403. Unlike the first sub-graph 401, each candidate GPS point in the second sub-graph 403 has a plurality of candidate heuristic costs that are based on the different paths that include the candidate GPS point. Each different path may potentially represent the shortest path in the sub-graph. In one embodiment, the map match module 117 selects as the heuristic cost for a candidate GPS point the heuristic cost from the plurality of candidate heuristic costs that has the smallest value as described below.

For example, with reference to FIG. 6A, candidate GPS point (1,1) includes a first candidate heuristic cost based on a first path. The first path includes candidate GPS point (2,0) and unevaluated edge 601 that connects together candidate GPS point (1,1) and candidate point (2,0). The first candidate heuristic cost for candidate GPS point (1,1) is 1 and is calculated based on the first path as follows:

$h\_cost(1,1)\_candidate1=\text{Node\_cost\_}(1,1)+\text{Edge\_cost}(1,0),(2,0)+h\_cost(2,0)$ $h\_cost(1,1)\_candidate1=1+0+0$ $h\_cost(1,1)\_candidate1=1$ Candidate GPS point (1,1) also includes a second heuristic cost based on a second path. The second path includes candidate GPS point (2,1) and unevaluated edge 603 that connects together candidate GPS point (1,1) and candidate point (2,1). The second candidate heuristic cost of 2 is for candidate GPS point (1,1) is calculated based on the second path as follows:

$h\_cost(1,1)\_candidate2=Node\_cost\_(1,1)+Edge\_cost(1,1),(2,1)+h\_cost(2,1)$ $h\_cost(1,1)\_candidate2=2+0+0$ $h\_cost(1,1)\_candidate2=2$ The map module 117 compares candidate heuristic costs for the candidate GPS point to determine the lower cost. That is, map match module 117 compares the first candidate heuristic cost and the second candidate heuristic cost for candidate GPS point (1,1) and determines that the first candidate heuristic cost is associated with the smaller value. Thus, the map module 117 sets the heuristic cost for candidate GPS point (1,1) as 1.

Figure 6B:
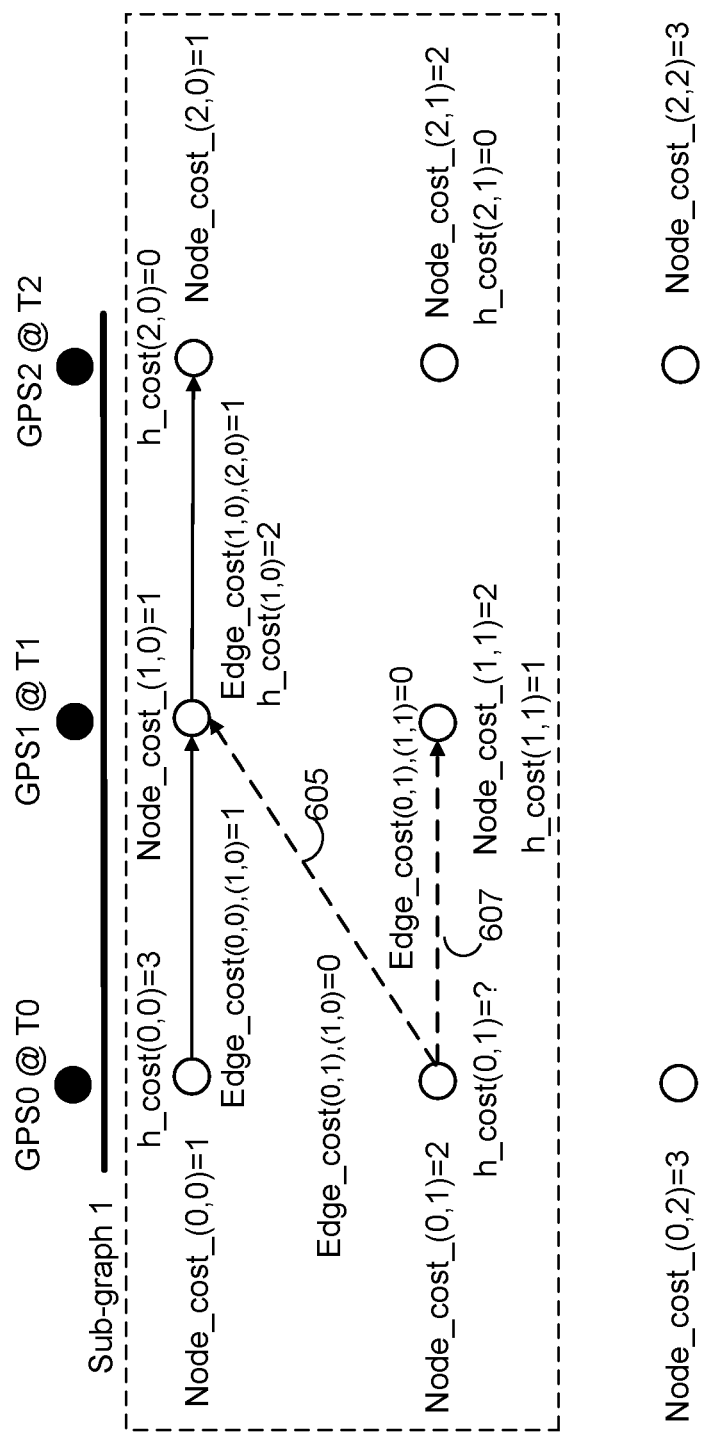

As shown in FIG. 6B, the map match module 117 has identified the heuristic costs for candidate GPS points (2,0), (2,1), (1,0), and (1,1). Next the map match module 117 identifies the heuristic costs for candidate GPS points (0,0) and (0,1). Similar to candidate GPS point (1,1), candidate GPS point (0,1) includes a plurality of candidate heuristic costs based on the different paths that include the candidate GPS point (0,1). For example, candidate GPS point (0,1) includes a first candidate heuristic cost based on a first path that includes candidate GPS point (1,0) and unevaluated edge 605 that connects together candidate GPS point (0, 1) and candidate GPS point (1,0). The first candidate heuristic cost of 3 for candidate GPS point (0,1) is calculated based on the first path as follows:

$h\_cost(0,1)\_candidate1=Node\_cost\_(0,1)+Edge\_cost(0,1),(1,0)+h\_cost(1,0)$ $h\_cost(0,1)\_candidate1=1+0+2$ $H\_cost(0,1)\_candidate=3$ Candidate GPS point (0,1) also includes a second heuristic cost based on a second path. The second path includes candidate GPS point (1,1) and unevaluated edge 607 that connects together candidate GPS point (0,1) and candidate point (1,1). The second candidate heuristic cost of 3 for candidate GPS point (0,1) is calculated based on the second path as follows:

$h\_cost(0,1)\_candidate2=Node\_cost\_(0,1)+Edge\_cost(0,1),(1,1)+h\_cost(1,1)$ $h\_cost(0,1)\_candidate2=2+0+1$ $h\_cost(0,1)\_candidate2=3$ The map module 201 compares the first candidate heuristic cost and the second candidate heuristic cost for candidate GPS point (0,1) and determines that the first candidate heuristic cost and the second candidate heuristic cost have the same value of 3. Thus, the map module 201 sets the heuristic cost for candidate GPS point (0,1) as 3.

Figure 6C:
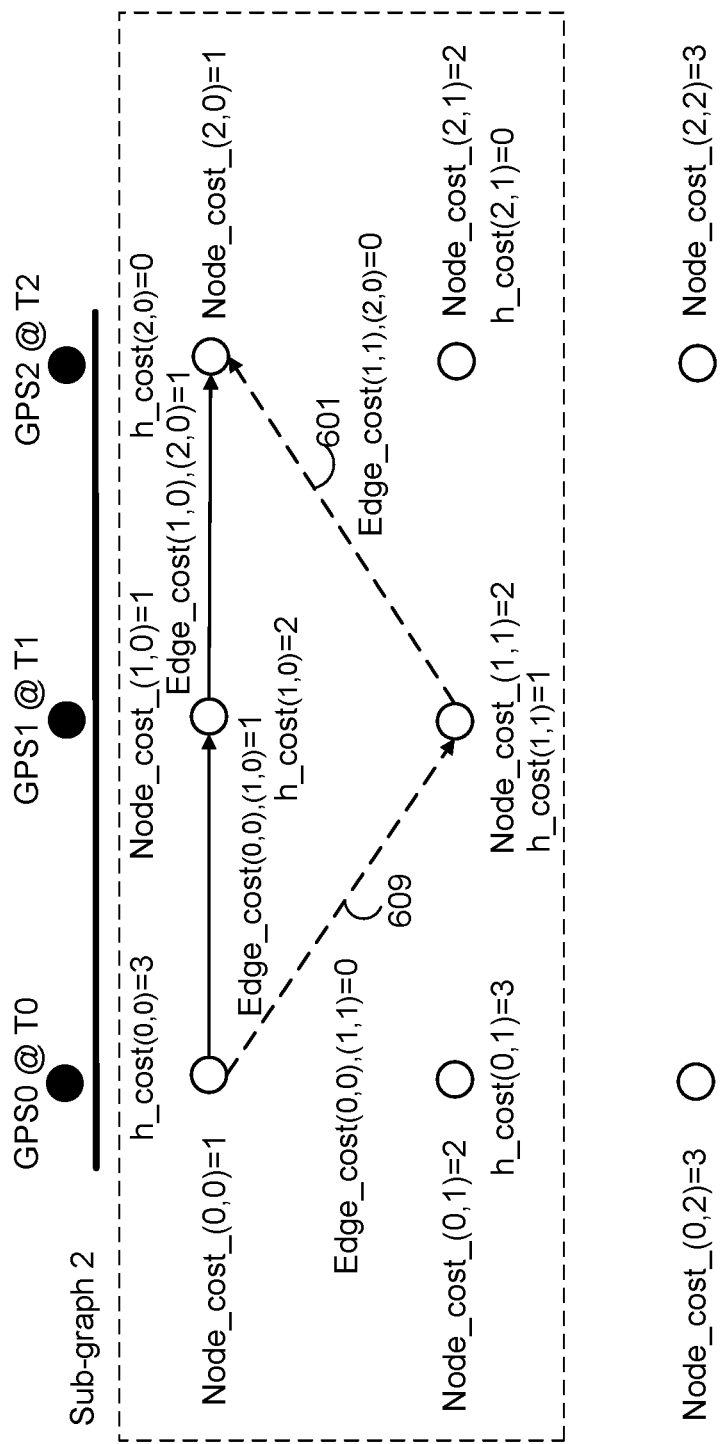

With respect to FIG. 6C, prior to applying the A* algorithm to the second sub-graph 403 which includes the expensive edge calculation, the map match module 117 identifies the shortest path from the starting location to the destination location using evaluated and unevaluated edges. Thus, the map match module 117 does not attempt to evaluate an unevaluated edge, but will use the values of evaluated edges since the computational time has already been used by the map match module 117. The map match module 117 identifies the shortest path to include candidate GPS point (0,0), candidate GPS point (1,1), and candidate GPS point (2,0) connected via unevaluated edge 609 and unevaluated edge 601. Note that the map match module 117 selects candidate GPS point (2,0) rather than candidate GPS point (2,1) because candidate GPS point (2,0) has a lower node cost than candidate GPS point (2,1).

Using the unevaluated edges, the map match module 117 calculates the cost of the path shown in FIG. 6C as follows:

$Total\_cost=Node\_cost\_(0,0)+Edge\_cost(0,0),(1,1)+Node\_cost\_(1,1)+Edge\_cost(1,1)(2,0)+Node\_cost\_(2,0)$ Total cost=+0+2+0+1

Total cost=4

The map match module 117 compares the total cost of the path with evaluated and unevaluated edges with the total cost of the "best" path to determine whether the path with the unevaluated edges in the second sub-graph has a greater total cost than the "best" path from the first sub-graph. In this example, the total cost of the path with the evaluated and unevaluated edges is 4 which is less than the total cost of 5 of the "best" path currently identified by the map match module 117. Thus, the path identified in the second sub-graph is potentially better than the currently identified "best" path. Accordingly, the map match module 117 determines to apply the A* algorithm to the second sub-graph to determine the actual cost of the path identified in the second sub-graph 403.

Figure 6D:
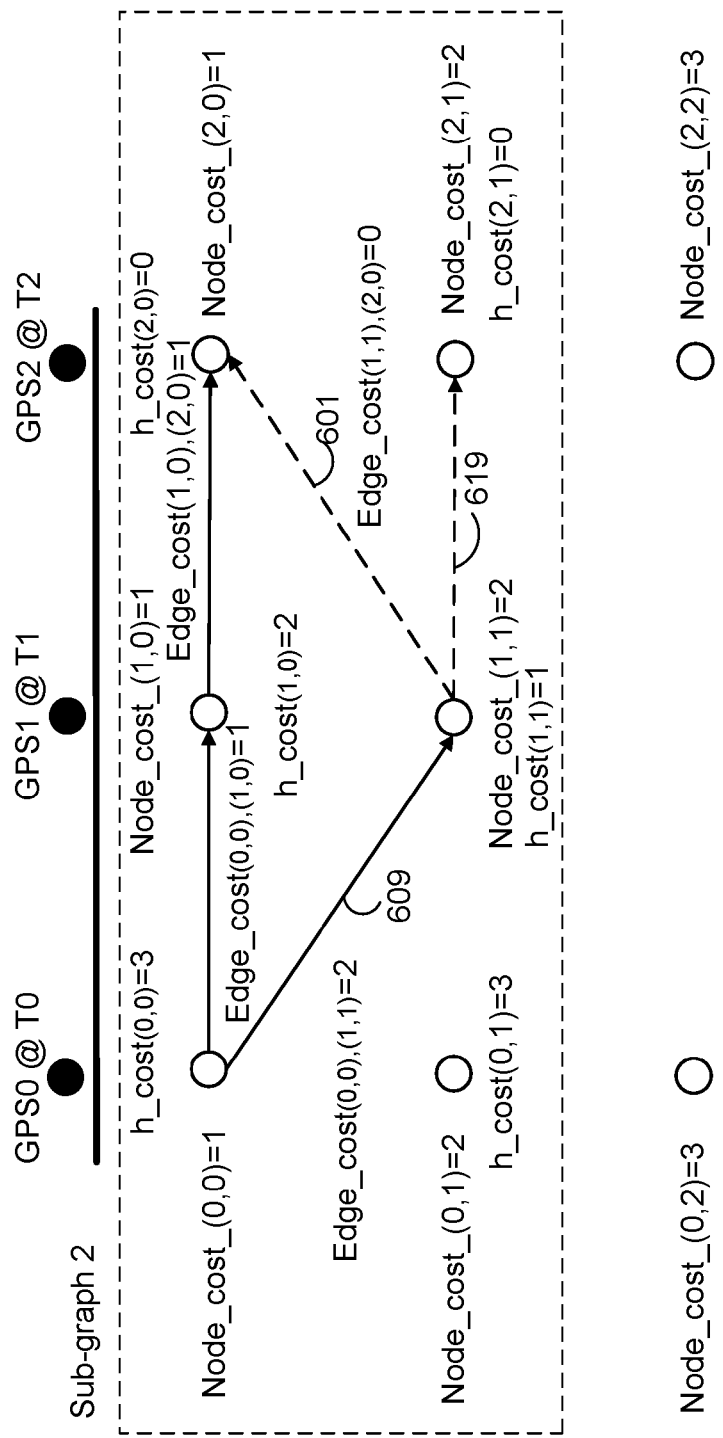

Referring to FIG. 6D, the map match module 117 applies the A* algorithm to the second sub-graph 403. Starting from the first candidate GPS point (0,0), the map match module 117 expands the path towards the destination location by connecting together candidate GPS point (0,0) and candidate GPS point (1,1) via edge 609. The map match module 117 calculates an edge cost of 2 for edge 609.

The map module 201 then identifies the cost of the path from candidate GPS point (1,1) to the destination location shown in FIG. 6D using the calculated edge cost and a zero cost for any unevaluated edges in the path. Assuming an edge cost of zero for unevaluated edge 601, the map match module 117 calculates the total cost for the path. The map match module 117 calculates the total cost for path identified in the second sub-graph 403 as follows:

$Total\_cost\_Path=Node\_cost\_(0,0)+Edge\_cost(0,0),(1,1)+Node\_cost\_(1,1)+Edge\_cost(1,1)(2,0)+Node\_cost\_(2,0)$ Total cost Path=+2+2+0+1

Total cost Path=6

Since the total cost of the path in the second sub-graph 403 is higher than the total cost of the "best" path, the map match module 117 determines that candidate GPS point (1,1) will not be included in the "best" path as any path that includes the candidate GPS point will result in a longer path compared to the current "best" path. Accordingly, the map match module 117 does not insert the candidate GPS point (1,1) into the priority queue of the A* algorithm which is used to perform the repeated selection of minimum cost nodes to expand. By eliminating candidate GPS point (1,1) from the priority queue, the map match module 117 saves computational resources as the map match module 117 will not need to calculate the edge cost of edge 601 that connects together candidate GPS point (1,1) and candidate GPS point (2,0) which is a computationally expensive calculation. The map match module 117 will not need to calculate the edge cost of the edge 619 that connects together candidate GPS point (1,1) and candidate GPS point (2,1) as well.

In one embodiment, the map match module 117 determines whether to calculate edge costs of unevaluated edges in each sub-graph based on whether the total cost of paths that include the unevaluated edges are less costly than the current "best" path (e.g., the path identified in sub-graph 1). Thus, the map match module 117 refrains from calculating all edge costs of identified unevaluated edges in a sub-graph. In one embodiment, the map match module 117 makes a determination that is unnecessary to evaluate the edge cost of an unevaluated edge based on comparison of the cost of the path to the destination location that includes the unevaluated edge and the cost of the "best" path.

Figure 6E:
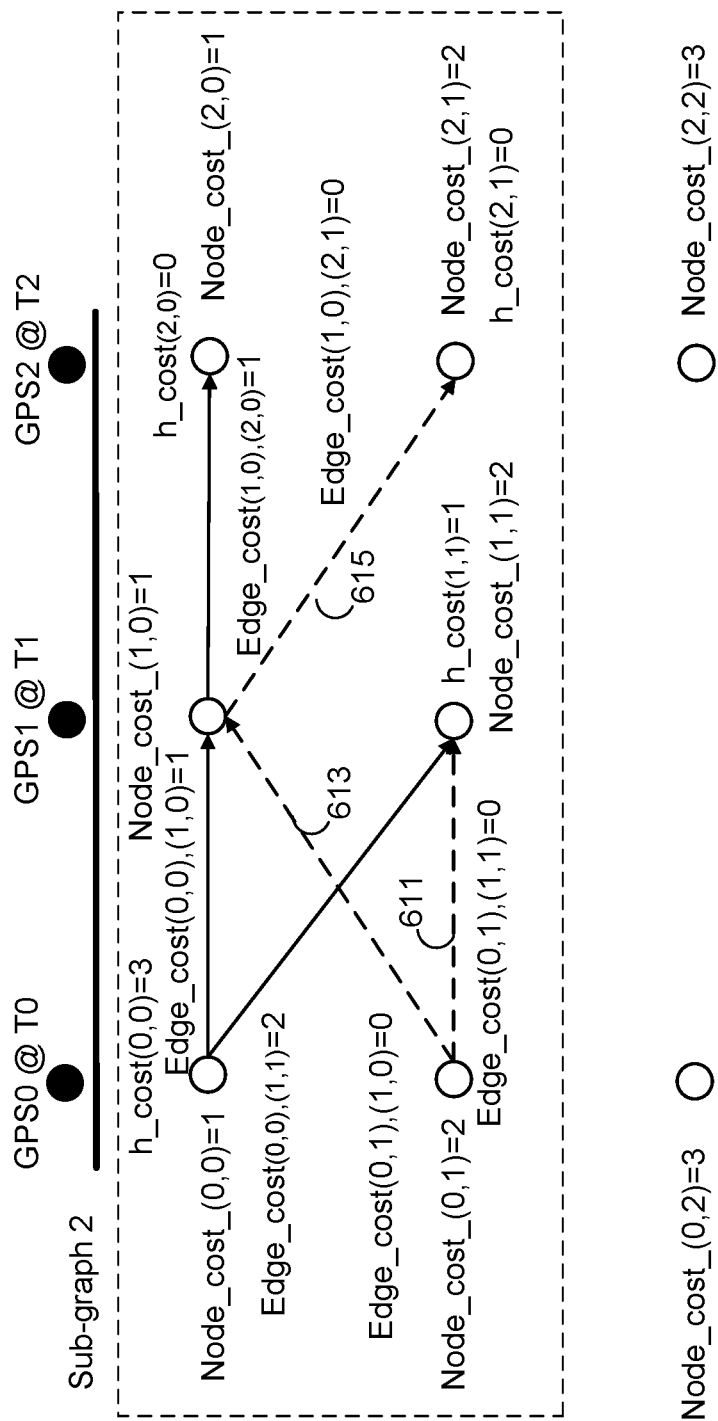

Referring to FIG. 6E, the map match module 117 determines it is unnecessary to calculate the edge costs of the unevaluated edges of the second sub-graph 403 (e.g., edge 611, edge 613, and edge 615). With respect to edge 611, the lower bound of the cost of the path to the destination location that includes edge 611 is calculated by the map match module 117 as follows:

CostPath_edge(0,1),(1,1)=Node_cost_(0,1)+edge-_cost(0,1),(1,1)+Node_cost_(1,1)+h_cost(1,1)

CostPath_edge(0,1),(1,1)=2+0+2+1

CostPath_edge(0,1),(1,1)=5

The map match module 117 determines it is unnecessary to evaluate the edge cost of edge 611 since the lower bound of the cost of the path that includes edge 611 is already equal to the cost of the "best" path identified in the first sub-graph 401. If the map match module 117 were to calculate the edge cost of edge 611, the resulting edge cost of edge 611 would only increase the cost of the path that includes edge 611 compared to the cost of the path when edge 611 is assumed to have a zero edge cost. Thus, the map match module 117 determines it is unnecessary to evaluate edge 611.

With respect to edge 613, the lower bound of the cost of the path to the destination location that includes edge 613 is calculated by the map match module 117 as follows:

CostPath_edge(0,1),(1,0)=Node_cost_(0,1)+edge-_cost(0,1),(1,0)+Node_cost_(1,0)+h_cost(1,0)

CostPath_edge(0,1),(1,1)=2+0+1+2

CostPath_edge(0,1),(1,1)=5

The map match module 117 determines it is unnecessary to evaluate the edge cost of edge 613 since the lower bound of the cost of the path that includes edge 613 is already equal to the cost of the "best" path identified in the first sub-graph 401. If the map match module 117 were to calculate the edge cost of edge 613, the resulting edge cost of edge 613 would only increase the cost of the path that includes edge 613 compared to the cost of the path when edge 613 is assumed to have a zero edge cost. Thus, the map match module 117 determines it is unnecessary to evaluate edge 613.

Lastly, with respect to edge 615, the map match module 117 identifies the lower bound of the cost of any path to the destination location that includes edge 615. During the process of the A* algorithm on the second sub-graph, at the moment that candidate GPS point (1,0) is removed from the priority queue, the map match module 117 determines that the least cost path from the source destination to candidate GPS point (1,0) in the second sub-graph has a cost of 2. Thus, the cost of any path that includes edge 615 is at least 5 based on the following calculation:

Lower_Bound_Path_through_edge(1,0),(2,1)=Least-_cost_to_(1,0)+Node_cost(1,0)+edge_cost(1,0),(2,1)+h_cost(2,1)

Lower_Bound_Path_through_edge(1,0),(2,1)=2+1+0+2

Lower_Bound_Path_through_edge(1,0),(2,1)=5

Since the lower bound of the cost of any path from the source location to the destination location that includes edge 615 is 5, the map match module 117 determines it is unnecessary to evaluate the edge cost of edge 615 the lower bound is already equal to the cost of the "best" path identified in the first sub-graph 401.

Figure 6F:
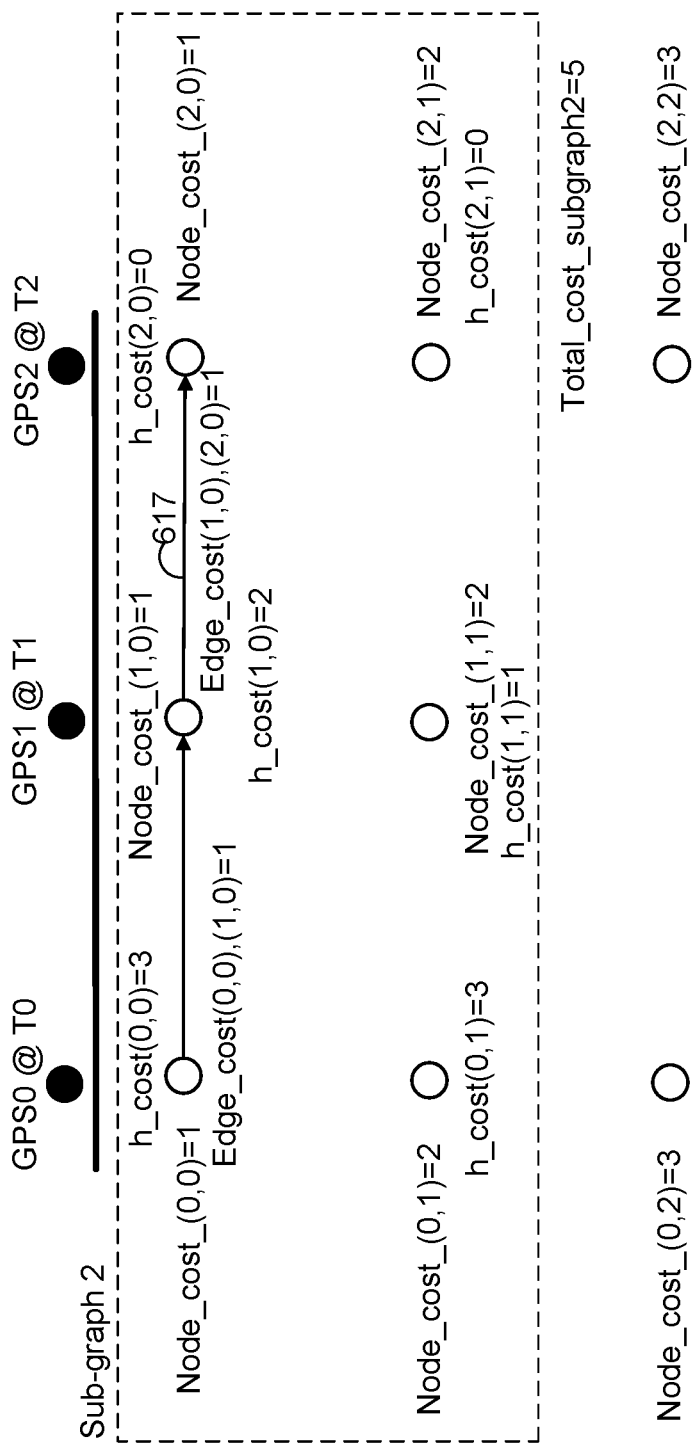
Figure 7:
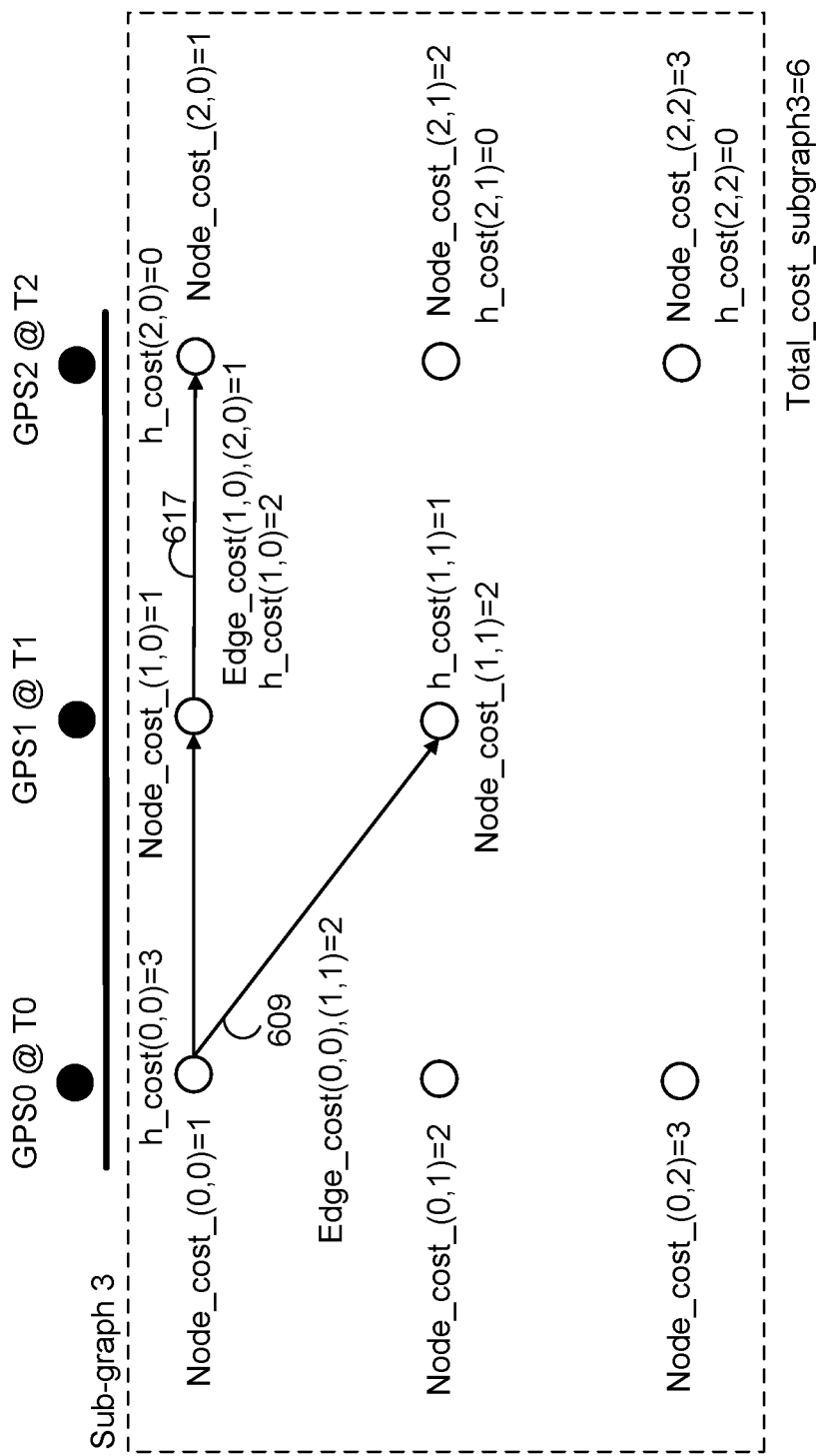
FIG. 7 illustrates an evaluation of the sub-graph shown in FIG. 4C according to one embodiment.

With respect to FIG. 6F, while running the A* algorithm on the second sub-graph, edges 611, 613 and 615 (shown in FIG. 6E) are determined to be unnecessary to evaluate, and candidate GPS point (1,1) is also pruned, so the A* algorithm will lead to the least cost path of 5 that travels through candidate GPS points (0,0), (1,0) and (2,0) as in the sub-graph 1.

The map match module 117 continues to evaluate the identified sub-graphs as described above to try to improve upon the current "best" path. In the example described herein, the last identified sub-graph is sub-graph 3 illustrated in FIG. 7. With respect to the third sub-graph 405, the map match module 117 determines whether to update the heuristic cost of any candidate GPS point based on evaluated edges from previously evaluated sub-graphs. In the example herein, the edge cost of edge 609 was calculated in the evaluation of the second sub-graph 403. The map match module 117 determines whether to update the heuristic cost of candidate GPS point (0,0) based on the edge cost of edge 609. However, the resulting heuristic cost of candidate GPS point (0,0) based on the edge cost of edge 609, the node cost of candidate GPS point (1,1), and the heuristic cost of candidate GPS point (1,1) is larger than the current heuristic cost of candidate GPS point (0,0). Thus, the map match module 117 refrains from updating the heuristic cost of candidate GPS point (0,0).

The map match module 117 determines that applying the A* algorithm to sub-graph 3 is unnecessary. The least cost path from the source to the destination in the third sub-graph, assuming an edge cost of zero for any unevaluated edge, is at least 5. So the map match module 117 determines that applying the A* algorithm to the third sub-graph is unnecessary. Note that the sub-graphs are inclusive. That is, the second sub-graph includes the first sub-graph, and the third sub-graph includes second sub-graph. Thus, when the A* algorithm is applied by the map match module 117 on sub-graph (i+1), the least cost path cannot be worse that the least cost path found on sub-graph i Accordingly, the map match module 117 determines that the map matched path of travel is the path identified in the first sub-graph 401 that includes candidate GPS point (0,0), candidate GPS point (1,0), and candidate GPS point (2,0) that are connected together via the road network represented by the edge between candidate GPS point (0,0) and candidate GPS point (1,0) and by the edge between candidate GPS point (1,0) and candidate GPS point (2,0). In one embodiment, the map match module 117 may provide the map matched path of travel on the service requestor device 103 to indicate the path of travel taken to reach the destination location.

Returning back to FIG. 1, the map server 100 also includes a fare calculation module 119. The fare calculation module 119 calculates fares for completed trips. In one embodiment, the fare calculation module 119 calculates a fare for a completed trip based on the determined map matched path of travel as described above. By basing the fare on the map matched path of travel rather than the path of travel based on the received GPS points, the map server 100 calculates the most accurate fare possible.

To calculate the fare, the fare calculation module 119 calculates the distance from the starting location of a trip to the destination location of the trip along the map matched path of travel. For example, the fare calculation module 119 determines the distance in miles or meters from the starting location of the trip to the destination location of the trip. The fare calculation module 119 then determines the cost per distance traveled (e.g., cost per mile such as $1.30 per mile) for the trip. The cost per distanced traveled is associated with the geographic location associated with the trip. For example, the cost per distanced traveled for the San Francisco Bay Area, California may be different than the cost per distance traveled for Los Angeles, Calif. The fare calculation module 119 multiplies the cost per distance traveled with the distance traveled to determine the distance component of the fare.

In one embodiment, the fare for a trip is also based the amount of time required to complete the trip. The fare calculation module 119 may determine the amount of time it took to complete the trip based on the time stamps associated with the GPS points received from the location tracking device 101 and multiples the time by a cost per time traveled (e.g., cost per minute) to calculate the time component of the fare. The cost per time traveled may also be dependent on the geographic location associated with the trip.

In one embodiment, the fare for a trip is also associated with a base fare. The base fare is a bare minimum that the person that requested the trip will be charged for the trip. The fare calculation module 119 may add the distance component, the time component, and the base fare to determine the fare for the trip. The fare calculation module 119 then applies a payment method of the person that requested the trip (e.g., charges a credit card) and communicates the fare to the service application 109 of the service requestor device 103 of the person. Through the techniques described herein, the improvement to fare calculation is a technical improvement that enables a more accurate distance calculation that is not available through conventional GPS measurement technology.

Figure 8:
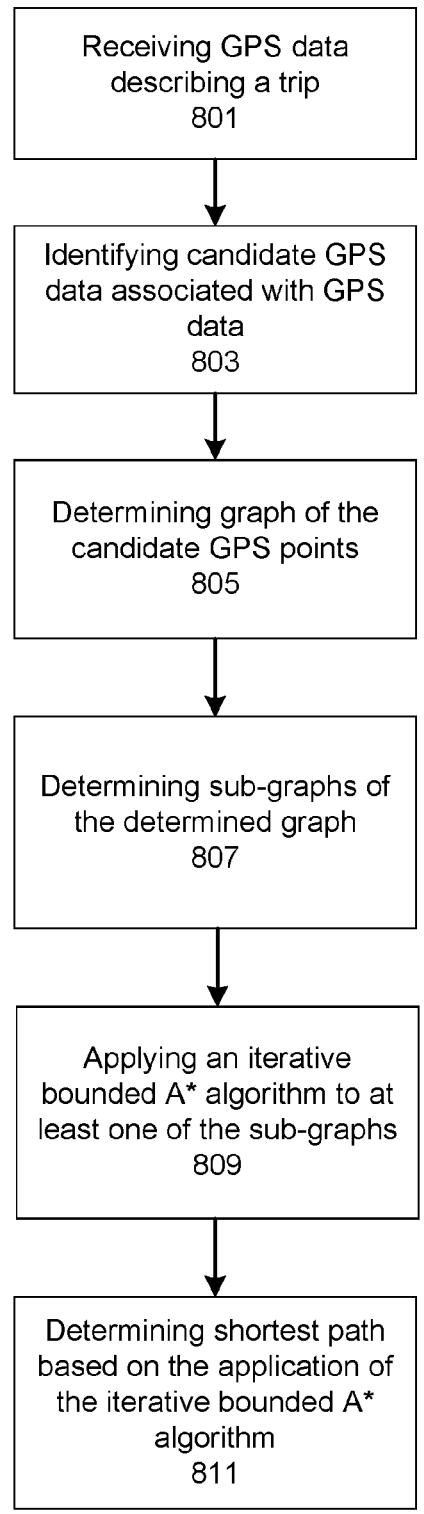
FIG. 8 is a method flow for calculating the shortest path of a trip, according to one embodiment.

FIG. 8 illustrates one embodiment of a method flow diagram for determining a map matched path of travel of a trip of a transportation vehicle. Note that in other embodiments, steps other than those shown in FIG. 8 may be performed to determine the trip for the transportation vehicle.

In one embodiment, the map server 100 receives 801 GPS data describing a trip of a transportation vehicle. The GPS data is received from a location tracking device 101 located within the transportation vehicle. According to some examples, the GPS data can be received during the progress of the trip (e.g., until the trip is completed). Subsequently, in one example, the map server 100 can perform one or more steps of FIG. 8 after the trip has completed. As an addition or an alternative, the map server 100 can perform one or more steps of FIG. 8 while the trip is in progress, before a trip is started, or before a trip is assigned to a service provider.

The map server 100 identifies 803 candidate GPS data associated with the GPS data received from the location tracking device 101. The GPS data may be inaccurate due to noise in the GPS signal. The map server 100 accordingly determines one or more candidate GPS points for each GPS point included in the GPS data that potentially represents the actual location of the location tracking device 101 at the time the GPS point was measured.

The map server 100 determines 805 a graph of the candidate GPS points. For example, the map server 100 may determine a trellis graph of the candidate GPS points. The map server 100 then determines 807 sub-graphs of the determined graph. The first sub-graph identified by the map match module 117 is the simplest sub-graph identified from the graph and includes only a first set of nodes (T, N) that represent the first set of candidate GPS points for the GPS points across time where T=0, 1, 2, 3, etc. and N=0. Each subsequently identified sub-graph is more complex than the previously identified sub-graph and includes all the candidate GPS points from the previously identified sub-graphs in addition to the next set of additional candidate GPS points (T, N+1) where T and N=0, 1, 2, 3, etc.

The map server 100 applies 809 an iterative bounded A* algorithm to at least one of the sub-graphs. In the application of the iterative bounded A* algorithm, the map sever 100 only evaluates a subset of the edges included in the sub-graphs to minimize the computational resources required to identify the shortest path of the graph. For example, the map server 100 first applies the A* algorithm to identify the shortest path from the first sub-graph from the determined sub-graphs. Applying the A* algorithm to the first sub-graph includes the computationally expensive calculation of edge costs of edges included in the first sub-graph. The shortest path identified from the first sub-graph is established as the "best" path. After each sub-graph is evaluated, the map server 100 iteratively evaluates the remaining sub-graphs in an attempt to improve upon the path identified in the first sub-graph.

For each subsequent sub-graph, the map server 100 determines whether to apply the A* algorithm to the candidate GPS points included in the sub-graph. The map server 100 may assume a zero cost for unevaluated edges in the subsequent sub-graph and determine whether resulting paths that include the unevaluated edges potentially result in a shorter path than the currently identified "best" path. For any paths that are potentially better than the currently identified "best" path, the map server 100 may apply the A* algorithm to at least a portion of the sub-graph.

As the sub-graph is expanded, the map server 100 calculates an edge cost for an edge. The map server 100 determines the cost for the current path that includes the evaluated edge and assumes any additional unevaluated edge required to reach the destination location has no cost. If the path results in a longer path than the current "best" path identified from a previously evaluated sub-graph, the map server 100 refrains from evaluating the unevaluated edges of the sub-graph since any edge costs identified for the unevaluated edges would result in an even longer path in the sub-graphs. If the cost path of each sub-graph indicates a shorter path than the current "best" path, the map server 100 continues applying the A* algorithm to identify the actual cost for the path that includes the expensive edge evaluation of edges.

By applying the iterative A* algorithm in the manner above, the map server 100 calculates the edge cost of a subset of edges included in the graph in order to determine 811 the shortest path from a starting location to destination location using the candidate GPS points without having to calculate all the edge costs of the edges in the graph. Thus, the map server 100 can more quickly compute map matched paths using the iterative bounded A* algorithm compared to conventional systems that apply the traditional A* algorithm.

Hardware Components

Figure 9:
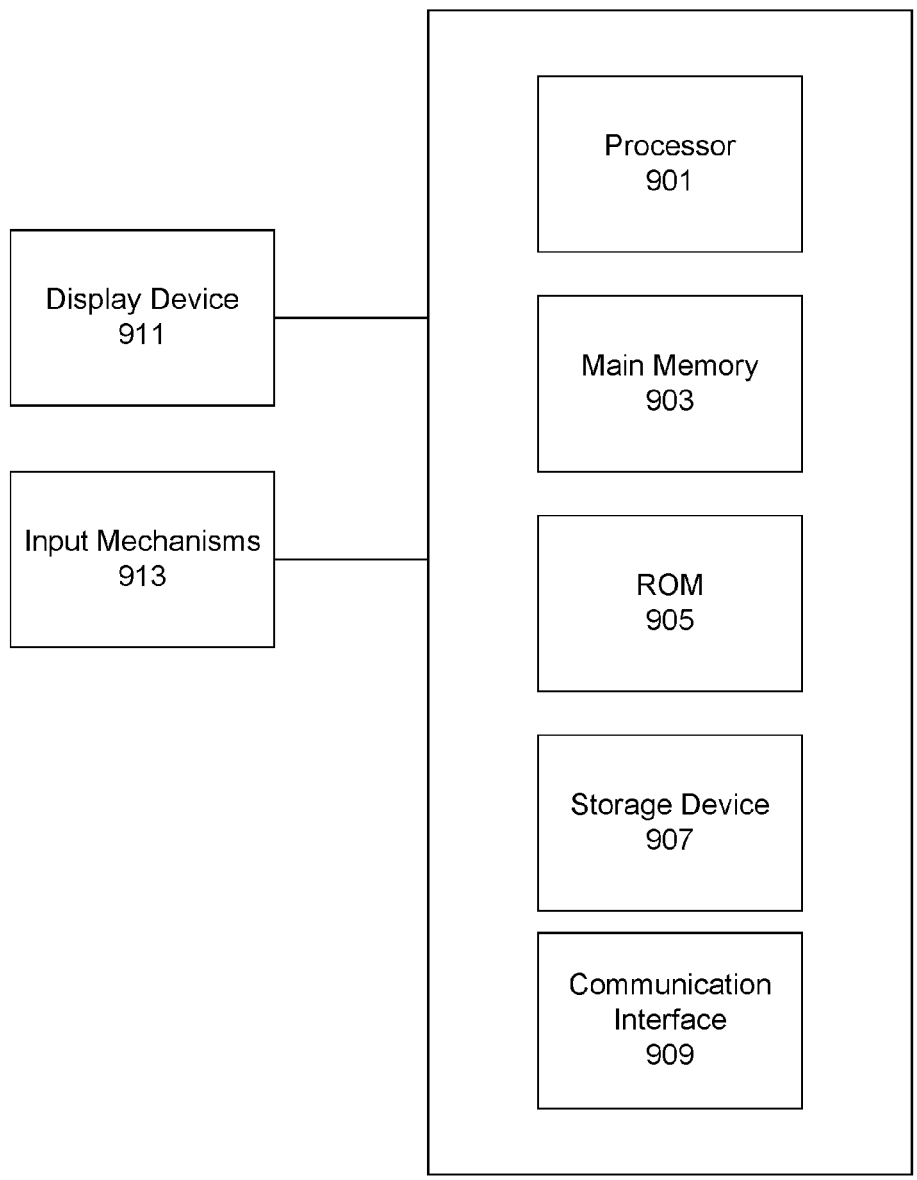
FIG. 9 illustrates a computer system that implements the embodiments herein according to one embodiment.

FIG. 9 is a diagram illustrating a computer system upon which embodiments described herein may be implemented. For example, in the context of FIG. 1, the map server 100 may be implemented using a computer system such as described by FIG. 9. The map server 100 may also be implemented using a combination of multiple computer systems as described by FIG. 9.

In one implementation, the map server 100 includes processing resources 901, main memory 903, read only memory (ROM) 905, storage device 907, and a communication interface 909. The map server 100 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. Map server 100 may also include ROM 905 or other static storage device for storing static information and instructions for processor 901. The storage device 907, such as a magnetic disk or optical disk, is provided for storing information and instructions.

The communication interface 909 can enable the map server 100 to communicate with one or more networks (e.g., cellular network) through use of the network link (wireless or wireline). Using the network link, the map server 900 can communicate with one or more computing devices, and one or more servers. In some variations, the map server 100 can be configured to receive sensor data (e.g., such as GPS data) from one or more location tracking devices via the network link. The sensor data can be processed by the processor 901 and can be stored in, for example, the storage device 907. The processor 901 can process the sensor data of a location tracking device in order to determine the path of travel of a transportation vehicle corresponding to the location tracking device. Extrapolated position information can be transmitted to one or more service requestor devices over the network 105 to enable the service applications 109 running on the service requestor devices to use the position information to present a visualization of the actual movement of the transportation vehicles.

The map server 100 can also include a display device 911, such as a cathode ray tube (CRT), an LCD monitor, or a television set, for example, for displaying graphics and information to a user. An input mechanism 913, such as a keyboard that includes alphanumeric keys and other keys, can be coupled to the map server 100 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911.

Examples described herein are related to the use of the map server 100 for implementing the techniques described herein. According to one embodiment, those techniques are performed by the map server 100 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

Figure 10:
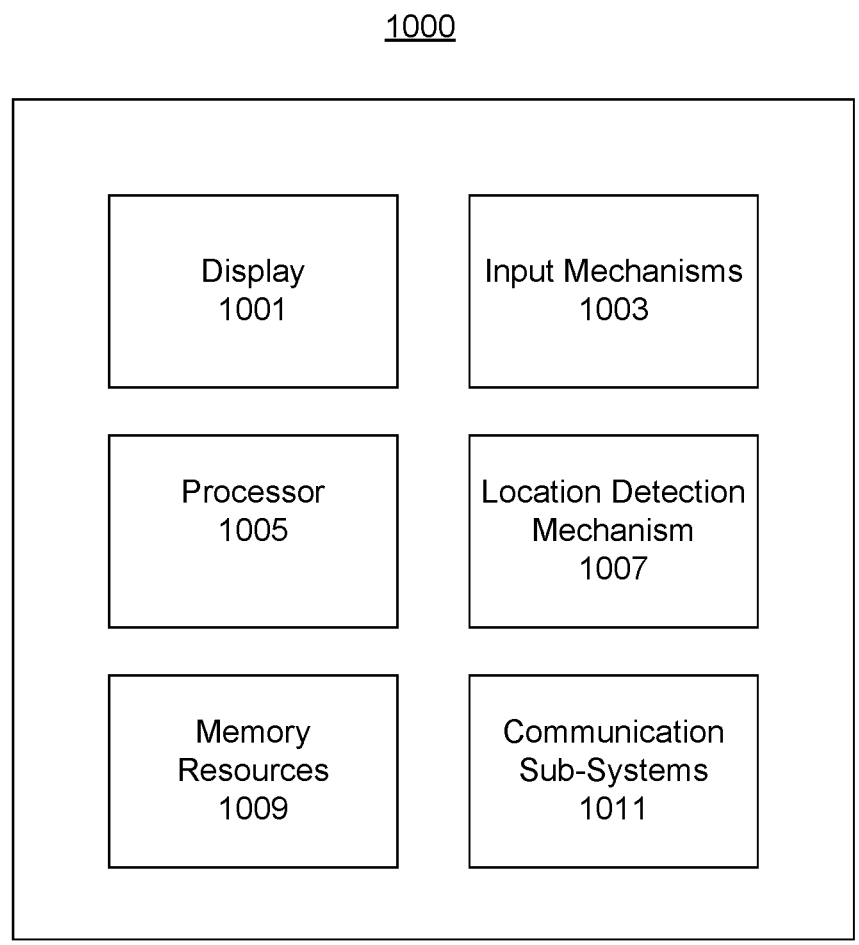
FIG. 10 illustrates a mobile computing device that implements the embodiments herein according to one embodiment.

FIG. 10 is a diagram illustrating a mobile computing device upon which embodiments described herein may be implemented. In one embodiment, a computing device 1000 may correspond to a mobile computing device, such as a cellular device that is capable of telephony, messaging, and data services. The computing device 1000 can correspond to each of the location tracking device 101 and the service requestor device 103. Examples of such devices include smartphones, handsets or tablet devices for cellular carriers. Computing device 1000 includes a processor 1005, memory resources 1009, a display device 1001 (e.g., such as a touch-sensitive display device), one or more communication sub-systems 1011 (including wireless communication sub-systems), input mechanisms 1003 (e.g., an input mechanism can include or be part of the touch-sensitive display device), and one or more location detection mechanisms (e.g., GPS module) 1007. In one example, at least one of the communication sub-systems 1011 sends and receives cellular data over data channels and voice channels.

The processor 1005 is configured with software and/or other logic to perform one or more processes, steps and other functions described with implementations, such as those described herein. Processor 1005 is configured, with instructions and data stored in the memory resources 1009, to operate a service application as described herein. For example, instructions for operating the service application in order to display user interfaces can be stored in the memory resources 1009 of the computing device 1000.

From the viewpoint of a service provider, a service provider operating a location tracking device 101 can operate the service application 111 so that sensor data, such as location/position data, can be determined from the location detection mechanism 1007. This location/position data can then be wirelessly transmitted to the system via the communication sub-systems 1011. From the viewpoint of an end-user, a user can operate the service application 109 in order to receive position information of one or more transportation vehicles from the system (via the communication sub-systems 1011).

The processor 1005 can provide content to the display 1001 by executing instructions and/or applications that are stored in the memory resources 1009. In some examples, one or more user interfaces can be provided by the processor 1005, such as a user interface for the service application, based at least in part on the received position information of the one or more transportation vehicles. While FIG. 10 is illustrated for a mobile computing device, one or more embodiments may be implemented on other types of devices, including full-functional computers, such as laptops and desktops (e.g., PC).

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for identifying a path of a trip, the method comprising:
   receiving a plurality of geographic points that describe a trip of a vehicle from a starting location to a destination location, each of the plurality of received geographic points associated with a timestamp, wherein the plurality of received geographic points are global positioning satellite (GPS) points received from a location tracking device located in the vehicle;
   identifying a set of candidate geographic points for each of the plurality of received geographic points, each candidate geographic point in the set representing a candidate location on a road network that is associated with the received geographic point;
   determining a graph that includes the sets of candidate geographic points for the plurality of received geographic points, each candidate geographic point arranged in the graph according to the timestamp of the received geographic point that is associated with the candidate geographic point;
   identifying a plurality of sub-graphs from the graph;
   iteratively applying an A* algorithm to a subset of the plurality of sub-graphs that evaluates only a portion of all possible edges that connect together the candidate geographic points in the graph without evaluating all of the possible edges, wherein the evaluation comprises initially setting a zero cost for edges of the plurality of sub-graphs; and
   identifying a shortest path of travel of the vehicle in the trip based on the iterative application of the A* algorithm to the subset of the plurality of sub-graphs, the shortest path of travel including a single candidate geographic point from each set of candidate geographical points.

2. The computer-implemented method of claim 1, wherein identifying the set of candidate geographic points comprises:
   identifying the set of candidate geographic points from a map database describing the road network, each candidate geographic point from the set being within a threshold distance from the received geographic point that is associated with the candidate geographic point.

3. The computer-implemented method of claim 1, wherein identifying the plurality of sub-graphs comprises:
   ordering the set of candidate GPS points for each of the plurality of received geographic points, each candidate GPS point ordered based on the candidate GPS point's distance to the corresponding received geographic point;
   determining a first sub-graph that includes a first candidate geographic point from one or more sets of candidate geographic points; and
   determining a second sub-graph that includes the first sub-graph and a second candidate geographic point from one or more sets of candidate geographic points.

4. The computer-implemented method of claim 3, wherein iteratively applying the A* algorithm comprises:
identifying a first path of travel from a first plurality of candidate paths of travel from the first sub-graph, the first path of travel using candidate geographic points in the first sub-graph and having a shortest distance from the starting location to the destination location from the first plurality of candidate paths of travel; and
attempting to identify a second path of travel from a second plurality of candidate paths of travel in the second sub-graph that has a shorter distance from the starting location to the destination location than the first path of travel.

5. The computer-implemented method of claim 4, further comprising:
responsive to identifying the second path of travel, declaration the second path of travel as the shortest path of travel of the vehicle; and
responsive to failing to identify the second path of travel, declaring the first path of travel as the shortest path of travel of the vehicle.

6. The computer-implemented method of claim 4, wherein attempting to identify the second path of travel comprises:
identifying a shortest path of travel from the second sub-graph;
calculating a cost of the shortest path of travel from the second sub-graph using the zero cost for unevaluated edges connecting together candidate geographic points included in the shortest path of travel from the second sub-graph, the cost of the shortest path of travel from the second sub-graph indicating a distance traveled along the shortest path of travel from the second sub-graph; and
responsive to a lower bound of the cost of the shortest path of travel from the second sub-graph including the unevaluated edges indicating that the shortest path of travel from the second sub-graph is equal to a cost of the first path of travel, refraining from further evaluating the second sub-graph and declaring the first path of travel as the shortest path of travel of the vehicle in the trip.

7. The computer-implemented method of claim 6, further comprising:
responsive to the lower bound of the cost of the shortest path of travel from the second sub-graph indicating that the shortest path of travel from the second sub-graph is shorter than the first path of travel:
applying the A* algorithm to the second sub-graph to iteratively evaluate an edge cost of each of a plurality of edges that are included in the second sub-graph;
responsive to each evaluation of an edge cost of an edge from the plurality of edges:
determining whether a cost of a path of travel from the second sub-graph that includes the edge cost of the evaluated edge indicates that the shortest path of travel from the second sub-graph is shorter than the first path of travel;
responsive to the cost of the shortest path of travel from the second sub-graph that includes the edge cost indicating that the shortest path of travel from the second sub-graph is not shorter than the first path of travel, ignoring the edge.

8. The computer-implemented method of claim 4, further comprising:
identifying a candidate geographic point from the second sub-graph that always results in a path of travel that is not shorter than the first path of travel if the candidate geographic point is included in the path of travel; and
ignoring the identified candidate geographic point.

9. The computer-implemented method of claim 1, further comprising:
calculating a fare for the trip from the starting location to the destination location based on the path of travel.

10. A computer program product comprising a non-transitory computer readable storage medium storing executable code for identifying a path of a trip, the code when executed by one or more computer processors causes the one or more computer processors to perform steps comprising:
receiving a plurality of geographic points that describe a trip of a vehicle from a starting location to a destination location, each of the plurality of received geographic points associated with a timestamp, wherein the plurality of received geographic points are global positioning satellite (GPS) points received from a location tracking device located in the vehicle;
identifying a set of candidate geographic points for each of the plurality of received geographic points, each candidate geographic point in the set representing a candidate location on a road network that is associated with the received geographic point;
determining a graph that includes the sets of candidate geographic points for the plurality of received geographic points, each candidate geographic point arranged in the graph according to the timestamp of the received geographic point that is associated with the candidate geographic point;
identifying a plurality of sub-graphs from the graph;
iteratively applying an A* algorithm to a subset of the plurality of sub-graphs that evaluates only a portion of all possible edges that connect together the candidate geographic points in the graph without evaluating all of the possible edges, wherein the evaluation comprises initially setting a zero cost for edges of the plurality of sub-graphs; and
identifying a shortest path of travel of the vehicle in the trip based on the iterative application of the A* algorithm to the subset of the plurality of sub-graphs, the shortest path of travel including a single candidate geographic point from each set of candidate geographical points.

11. The computer program product of claim 10, wherein identifying the set of candidate geographic points comprises:
identifying the set of candidate geographic points from a map database describing the road network, each candidate geographic point from the set being within a threshold distance from the received geographic point that is associated with the candidate geographic point.

12. The computer program product of claim 10, wherein identifying the plurality of sub-graphs comprises:
ordering the set of candidate GPS points for each of the plurality of received geographic points, each candidate GPS point ordered based on the candidate GPS point's distance to the corresponding received geographic point;
determining a first sub-graph that includes a first candidate geographic point from one or more sets of candidate geographic points; and
determining a second sub-graph that includes the first sub-graph and a second candidate geographic point from one or more sets of candidate geographic points.

13. The computer program product of claim 12, wherein iteratively applying the A* algorithm comprises:

identifying a first path of travel from a first plurality of candidate paths of travel from the first sub-graph, the first path of travel using candidate geographic points in the first sub-graph and having a shortest distance from the starting location to the destination location from the first plurality of candidate paths of travel; and attempting to identify a second path of travel from a second plurality of candidate paths of travel in the second sub-graph that has a shorter distance from the starting location to the destination location than the first path of travel.

14. The computer program product of claim 13, wherein the code when executed by one or more computer processors causes the one or more computer processors to perform further steps comprising:

responsive to identifying the second path of travel, declaration the second path of travel as the shortest path of travel of the vehicle; and responsive to failing to identify the second path of travel, declaring the first path of travel as the shortest path of travel of the vehicle.

15. The computer program product of claim 13, wherein attempting to identify the second path of travel comprises:

identifying a shortest path of travel from the second sub-graph;

calculating a cost of the shortest path of travel from the second sub-graph using the zero cost for unevaluated edges connecting together candidate geographic points included in the shortest path of travel from the second sub-graph, the cost of the shortest path of travel from the second sub-graph indicating a distance traveled along the shortest path of travel from the second sub-graph; and responsive to a lower bound of the cost of the shortest path of travel from the second sub-graph including the unevaluated edges indicating that the shortest path of travel from the second sub-graph is equal to a cost of the first path of travel, refraining from further evaluating the second sub-graph and declaring the first path of travel as the shortest path of travel of the vehicle in the trip.

16. The computer program product of claim 15, wherein the code when executed by one or more computer processors causes the one or more computer processors to perform further steps comprising:

responsive to the lower bound of the cost of the shortest path of travel from the second sub-graph indicating that the shortest path of travel from the second sub-graph is shorter than the first path of travel:

applying the A* algorithm to the second sub-graph to iteratively evaluate an edge cost of each of a plurality of edges that are included in the second sub-graph;

responsive to each evaluation of an edge cost of an edge from the plurality of edges:

determining whether a cost of a path of travel from the second sub-graph that includes the edge cost of the evaluated edge indicates that the shortest path of travel from the second sub-graph is shorter than the first path of travel;

responsive to the cost of the shortest path of travel from the second sub-graph that includes the edge cost indicating that the shortest path of travel from the second sub-graph is not shorter than the first path of travel, ignoring the edge.

17. The computer program product of claim 13, wherein iteratively applying the A* algorithm comprises:

identifying a candidate geographic point from the second sub-graph that always results in a path of travel that is not shorter than the first path of travel if the candidate geographic point is included in the path of travel; and ignoring the identified candidate geographic point.

18. The computer program product of claim 10, where the code when executed by the one or more computer processors further causes the one or more computer processors to perform steps comprising:

calculating a fare for the trip from the starting location to the destination location based on the path of travel.

* * * * *